(12) United States Patent
Hamada

(10) Patent No.: US 8,224,155 B2
(45) Date of Patent: Jul. 17, 2012

(54) TECHNIQUES FOR PREVENTING SKIPPING PLAYBACK OF CONTENT

(75) Inventor: Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 1198 days.

(21) Appl. No.: 11/885,203

(22) PCT Filed: Dec. 27, 2006

(86) PCT No.: PCT/JP2006/326011
§ 371 (c)(1),
(2), (4) Date: Aug. 28, 2007

(87) PCT Pub. No.: WO2007/077858
PCT Pub. Date: Jul. 12, 2007

(65) Prior Publication Data
US 2008/0317433 A1    Dec. 25, 2008

(30) Foreign Application Priority Data
Dec. 28, 2005    (JP) ................................. 2005-378841

(51) Int. Cl.
*H04N 9/80* (2006.01)
(52) U.S. Cl. ......................................... 386/248; 386/344
(58) Field of Classification Search .................. 386/343, 386/344, 345, 350, 351, 241, 248
See application file for complete search history.

(56) References Cited

U.S. PATENT DOCUMENTS

| | | | |
|---|---|---|---|
| 6,085,021 A | 7/2000 | Tozaki et al. | |
| 6,215,952 B1 | 4/2001 | Yoshio et al. | |
| 6,470,140 B1* | 10/2002 | Sugimoto et al. | 386/248 |
| 6,993,248 B1 | 1/2006 | Kato | |
| 7,840,113 B2* | 11/2010 | Hayashibara | 386/340 |
| 7,881,591 B2* | 2/2011 | Hayashi | 386/343 |
| 2001/0028786 A1* | 10/2001 | Hamada et al. | 386/69 |
| 2002/0164152 A1 | 11/2002 | Kato et al. | |
| 2004/0101285 A1* | 5/2004 | Seo et al. | 386/95 |

(Continued)

FOREIGN PATENT DOCUMENTS
EP    1061738 A2    12/2000
(Continued)

OTHER PUBLICATIONS

Blu-Ray Disc Founders: "White paper Blu-Ray Disc Format: 2.B Audio Visual Application format specification for BD-ROM", http://www.blu-raydisc.com/assets/downloadablefile/2b_bdrom_audiovisualapplication-12841.pdf, retrieved on Jan. 23, 2003.

*Primary Examiner* — David Harvey
(74) *Attorney, Agent, or Firm* — Wolf, Greenfield & Sacks, P.C.

(57) ABSTRACT

The present invention relates to a playback apparatus, playback method, a storage apparatus, a storage method, a program, a storage medium, a data structure, and a method of producing a storage medium, capable of controlling non-normal playback operations. In a state in which PlayItem_random_access_flag is set to 0 for PlayItem(1) and PlayItem (3) and an Entry Mark is defined in PLayItem(2) for which PlayItem_random_access_flag is set to 1, if a user operation occurs to request a jump to the Entry Mark in PlayItem(2) when a Clip AV stream pointed to by PlayItem(1) is being played back, the playback position jumps not to the Entry Mark in PlayItem(2) but to the beginning of a Clip AV stream pointed to by PlayItem(2). The present invention is applicable to a playback apparatus and a storage apparatus.

16 Claims, 28 Drawing Sheets

U.S. PATENT DOCUMENTS

2005/0105888 A1    5/2005    Hamada et al.
2006/0031892 A1*    2/2006    Cohen .............................. 725/88

FOREIGN PATENT DOCUMENTS

| | | |
|---|---|---|
| EP | 1326173 A1 | 7/2003 |
| EP | 1 717 808 A1 | 11/2006 |
| JP | 9-251761 | 9/1997 |
| JP | 9-274776 | 10/1997 |
| JP | 2000-341640 A | 12/2000 |
| JP | 2002-158965 A | 5/2002 |
| JP | 2004-328450 A | 11/2004 |
| WO | 2005-078727 | 2/2005 |
| WO | WO 2005/024828 | 3/2005 |

* cited by examiner

FIG. 6

| Syntax | No.of bits | Mnemonic |
|---|---|---|
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++){ | | |
|         padding_word | 16 | bslbf |
|     } | | |
|     PlayList() | | |
|     for(i=0; i<N2; i++){ | | |
|         padding_word | 16 | bslbf |
|     } | | |
|     PlayListMark() | | |
|     for(i=0; i<N3; i++){ | | |
|         padding_word | 16 | bslbf |
|     } | | |
|     ExtensionData() | | |
|     for(i=0; i<N4; i++){ | | |
|         padding_word | 16 | bslbf |
|     } | | |
| } | | |

FIG. 7

| Syntax | No.of bits | Mnemonic |
|---|---|---|
| AppInfoPlayList(){ | | |
|   length | 32 | uimsbf |
|   reserved_for_future_use | 8 | bslbf |
|   PlayList_playback_type | 8 | bslbf |
|   if(PlayList_playback_type==2\|\|PlayList_playback_type==3){ | | |
|     playback_count | 16 | uimsbf |
|   }else{ | | |
|     reserved_for_future_use | 16 | bslbf |
|   } | | |
|   UO_mask_table() | | |
|   PlayList_random_access_flag | 1 | bslbf |
|   audio_mix_app_flag | 1 | bslbf |
|   lossless_may_bypass_mixer_flag | 1 | bslbf |
|   reserved_for_future_use | 13 | bslbf |
| } | | |

FIG. 8

| Syntax | No. of bits | Mnemonic |
|---|---|---|
| PlayList(){ | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0;<br>    PlayItem_id<number_of_PlayItems;<br>    PlayItem_id++){ | | |
|     PlayItem() | | |
|   } | | |
|   for (SubPath_id= 0;<br>    SubPath_id<number_of_SubPaths;<br>    SubPath_id++){ | | |
|     SubPath() | | |
|   } | | |
| } | | |

FIG. 9

| Syntax | No.of bits | Mnemonic |
|---|---|---|
| PlayItem(){ | | |
|     length | 16 | uimsbf |
|     Clip_Information_file_name[0] //angle_id=0 | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | bslbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_flag | 1 | bslbf |
|     reserved_for_future_use | 7 | bslbf |
|     still_mode | 8 | bslbf |
|     if(still mode==0x01){ | | |
|         still time | 16 | uimsbf |
|     }else{ | | |
|         reserved_for_future_use | 16 | bslbf |
|     } | | |
|     if(is_multi_angle==1b){ | | |
|         multi_clip_entries(){ | | |
|             number_of_angles | 8 | uimsbf |
|             reserved_for_future_use | 6 | bslbf |
|             is_different_audios_ | 1 | bslbf |
|             is_seamless_angle_change | 1 | bslbf |
|             for(angle_id=1;//Note:angles except angle_id=0 | | |
|             angle_id<number_of_angles;angle_id++){ | | |
|                 Clip_Information_file_name[angle_id] | 8*5 | bslbf |
|                 Clip_codec_identifier[angle_id] | 8*4 | bslbf |
|                 ref_to_STC_id[angle_id] | 8 | uimsbf |
|             } | | |
|         } | | |
|     } | | |
|     STN_table() | | |
| } | | |

FIG. 10

| Syntax | No.of bits | Mnemonic |
|---|---|---|
| PlayListMark(){ | | |
|   length | 32 | uimsbf |
|   number_of_PlayList_marks | 16 | uimsbf |
|   for(PL_mark_id=0; | | |
|   PL_mark_id<number_of_PlayList_marks; | | |
|   PL_mark_id++){ | | |
|     reserved_for_future_use | 8 | bslbf |
|     mark_type | 8 | bslbf |
|     ref_to_PlayItem_id | 16 | uimsbf |
|     mark_time_stamp | 32 | uimsbf |
|     entry_ES_PID | 16 | uimsbf |
|     duration | 32 | uimsbf |
|   } | | |
| } | | |

FIG. 28

| Syntax | No.of bits | Mnemonic |
|---|---|---|
| UO_mask_table(){ | | |
| chapter_search_mask | 1 | bslbf |
| time_search_mask | 1 | bslbf |
| skip_to_next_point_mask | 1 | bslbf |
| skip_back_to_previous_point_mask | 1 | bslbf |
| forward_play_mask | 1 | bslbf |
| backward_play_mask | 1 | bslbf |
| } | | |

TECHNIQUES FOR PREVENTING SKIPPING PLAYBACK OF CONTENT

TECHNICAL FIELD

The present invention relates to a playback apparatus, playback method, a storage apparatus, a storage method, a program, a storage medium, a data structure, and a method of producing a storage medium, and more particularly, to a playback apparatus, playback method, a storage apparatus, a storage method, a program, a storage medium, a data structure, and a method of producing a storage medium, capable of restricting non-normal playback operations in an advantageous manner.

BACKGROUND ART

In conventional DVD video, it is allowed to prohibit non-normal-speed playback operations for particular parts. Prohibition is allowed to be defined in units of chapters. When one of such chapters is being played back, if a user operation of requesting a playback operation at a non-normal speed such as a fast-forward operation or a fast-backward operation occurs, the request is rejected.

It is known to define entry points in the form of a map for use in random access (an example may be found, for example, in Patent Document 1). It is also known to manage jumping of a playback position by using marks and PIN numbers (an example may be found, for example, in Patent Document 2).

[Patent Document 1] Japanese Unexamined Patent Application Publication No. 2000-341640

[Patent Document 2] Japanese Unexamined Patent Application Publication No. 2002-158965

DISCLOSURE OF THE INVENTION

Problems to be Solved by the Invention

However, in the DVD video, it is difficult to control search-based user operations such as a jump of the playback position to a specified point. Therefore, although it is possible to prohibit the fast-forward operation or the fast-backward operation, which is a user operation using a variable of time as an argument, by defining a range for which playback operations at non-normal speeds are prohibited, it is not possible to perfectly prevent this range from being skipped without being played back, because skipping of this range is possible by a jump-to-next-point command unless both chapter jumping and non-normal-speed operations are prohibited for this range.

Note that a technique to prohibit non-normal playback operations is not disclosed in any of Patent Document 1 and Patent Document 2.

In view of the above, the present invention provides a technique to control non-normal playback operations.

Means for Solving the Problems

According to an aspect of the present invention, there is provided a playback apparatus including playback control means adapted to acquire second playback management information for managing playback of a content file including at least one stream and control playback of the content file in accordance with the acquired second playback management information, the second playback management information including at least one piece of first playback management information including information indicating a position, on a playback time axis, of the content file, and playback means for playing back the content file under the control of the playback control means, wherein the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back.

The second permission information may be information indicating whether to accept a user operation of requesting a jump of the playback position, by a playback operation at a non-normal speed, to one of points in a stream whose playback is managed by second permission information.

The second permission information may be information indicating whether to accept a user operation of requesting a jump of the playback position to a point, indicated by the jump destination information, in a stream whose playback is managed by the first playback management information.

If the first permission information is defined so as not to accept the user operation of requesting the jump of the playback position to any point in the stream whose playback is managed by the second playback management information, the playback control means may control the playback of the content file such that the playback position is moved to the beginning of the stream whose playback is managed by the second playback management information.

When the second permission information is defined so as not to accept the user operation of requesting the jump of the playback position to any point in the stream whose playback is managed by the first playback management information, if the playback position from which to make the jump is temporally prior to the stream whose playback is managed by the first playback management information or if the requested jump is a jump performed without using a variable of time, then the playback control means may control the playback of the content file such that the playback position is moved to the beginning of the stream whose playback is managed by the first playback management information.

When the second permission information is defined so as not to accept the user operation of requesting the jump of the playback position to any point in the stream whose playback is managed by the first playback management information, if the requested jump is a jump performed without using a variable of time and if the playback position from which to make the jump is temporally subsequent to the stream whose playback is managed by the first playback management information, then the playback control means may control the playback of the content file such that the playback position is moved to the beginning of a stream following the stream whose playback is managed by the first playback management information.

The first playback management information may further include user operation restriction information defining one or more user operations which should not be accepted during playback of the stream whose playback is managed by the first playback management information. When a user operation occurs in a state in which the stream whose playback is managed by the first playback management information is being played back, if the user operation is one of those which are defined as unacceptable in the user operation restriction information, the playback control means may prohibit acceptance of the user operation.

The second playback management information may further include user operation restriction information defining one or more user operations which should not be accepted during playback of the stream whose playback is managed by the second playback management information. When a user operation occurs in a state in which the stream whose playback is managed by the second playback management information is being played back, if the user operation is one of those which are defined as unacceptable in the user operation restriction information, the playback control means may prohibit acceptance of the user operation.

The destination of the playback position jump designated by the jump destination information may be set independently of the playback range of the stream whose playback is managed by the first playback management information.

According to an aspect of the present invention, there is provided a playback method for a playback apparatus adapted to play back a content file, the method comprising the steps of acquiring second playback management information for managing playback of a content file including at least one stream, the second playback management information including at least one piece of first playback management information including information indicating a position, on a playback time axis, of the content file, and controlling playback of the content file in accordance with the acquired second management information and the first management information included in the second management information, wherein the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back.

According to an aspect of the present invention, there is provided a program executable by a computer to perform a process of playing back a content file, the process comprising the steps of preparing information including first playback management information and second playback management information for use in playing back the content file, if the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and if the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back, then acquiring second playback management information including at least one piece of first playback management information including information indicating a position, on a playback time axis, of the content file including at least one stream, and controlling playback of the content file in accordance with the first management information included in the acquired second management information and the second permission information included in the first management information.

According to an aspect of the present invention, there is provided a storage medium storing data including second playback management information for managing playback of a content file including at least one stream, the second playback management information including at least one piece of first playback management information including information indicating a position, on a playback time axis, of the content file, wherein the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back.

According to an aspect of the present invention, there is provided a data structure including second playback management information for managing playback of a content file including at least one stream, the second playback management information including at least one piece of first playback management information including information indicating a position, on a playback time axis, of the content file, wherein the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back.

According to an aspect of the present invention, there is provided a method of producing a storage medium storing data playable by a playback apparatus, comprising the step of producing data having a data structure including second playback management information for managing playback of a content file including at least one stream, the second playback management information including at least one piece of first playback management information including information indicating a position, on a playback time axis, of the content file, wherein the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back, the method further comprising the step of storing the produced data on the storage medium.

According to an aspect of the present invention, there is provided a storage apparatus adapted to store data playable by a playback apparatus on a storage medium, comprising acquisition means for acquiring data having a data structure including second playback management information for managing playback of a content file including at least one stream, the second playback management information including at least one piece of first playback management information including information indicating a position, on a playback time axis, of the content file, wherein the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back, the storage apparatus further comprising storing means for storing the data acquired by the acquisition means on the storage medium.

According to an aspect of the present invention, there is provided a storage method for a storage apparatus adapted to store data playable by a playback apparatus on a storage medium, comprising the step of acquiring data having a data structure including second playback management information for managing playback of a content file including at least one stream, the second playback management information including at least one piece of first playback management information including information indicating a position, on a playback time axis, of the content file, wherein the second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back, and the first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back, the method further comprising the step of storing the acquired data on the storage medium.

In an aspect of the present invention, a content file including at least one stream is played back on the basis of data including second playback management information for managing playback of the content file. The second playback management information includes at least one piece of first playback management information including information indicating a position, on a playback time axis, of the content file. The second playback management information includes jump destination information indicating a destination of a playback position jump and first permission information indicating whether to accept a user operation of requesting a jump of the playback position to one of points in a stream whose playback is managed by the second playback management information in a state in which a stream whose playback is managed by another second playback management information is being played back. The first playback management information includes second permission information indicating whether to accept a user operation of requesting a jump of a playback position to one of points in a stream whose playback is managed by the first playback management information in a state in which a stream whose playback is managed by another first playback management information included in the same second playback management information is being played back.

A network provides a mechanism of allowing two or more apparatuses connected to each other to transmit information to each other. Note that apparatuses connected for communication to each other via the network may be separate apparatuses or internal blocks in a single apparatus.

The communication may be performed via a cable or wirelessly, or the communication may be performed via a system including both a cable communication medium and a wireless communication medium. The communication may be performed such that communication from one apparatus to another apparatus is performed via a cable, and communication in an opposite direction is performed wirelessly.

Advantages

According to an aspect of the present invention, as described above, it becomes possible to restrict non-normal playback operations in an advantageous manner in playback of a content.

BRIEF DESCRIPTION OF THE DRAWINGS

FIG. 6 is a diagram illustrating a data structure of a PlayList file.

FIG. 7 is a diagram illustrating syntax of AppInfoPlayList( ).

FIG. 8 is a diagram illustrating syntax of PlayList( ).

FIG. 9 is a diagram illustrating syntax of PlayItem( ).

FIG. 10 is a diagram illustrating syntax of PlayListMark( ).

FIG. 28 is a diagram illustrating UO_mask_table( ).

Figure 1:
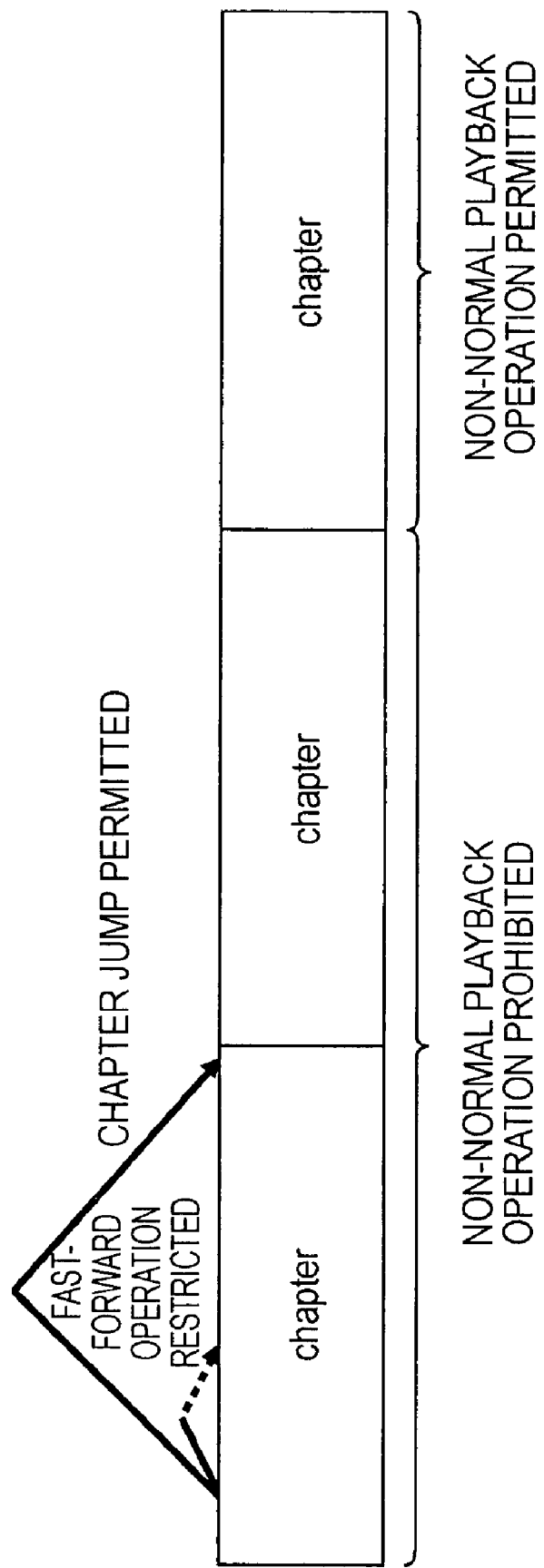
FIG. 1 is a diagram illustrating a playback operation of a DVD in non-normal modes according to a conventional technique.

REFERENCE NUMERALS 1 playback apparatus, 2 network, 3 server, 4 image/sound output apparatus, 11 storage medium, 12 remote commander, 21 controller, 22 storage drive, 23 memory, 24 local storage, 26 AV decoder

BEST MODE FOR CARRYING OUT THE INVENTION

Embodiments of the present invention are described below with reference to drawings.

Figure 2:
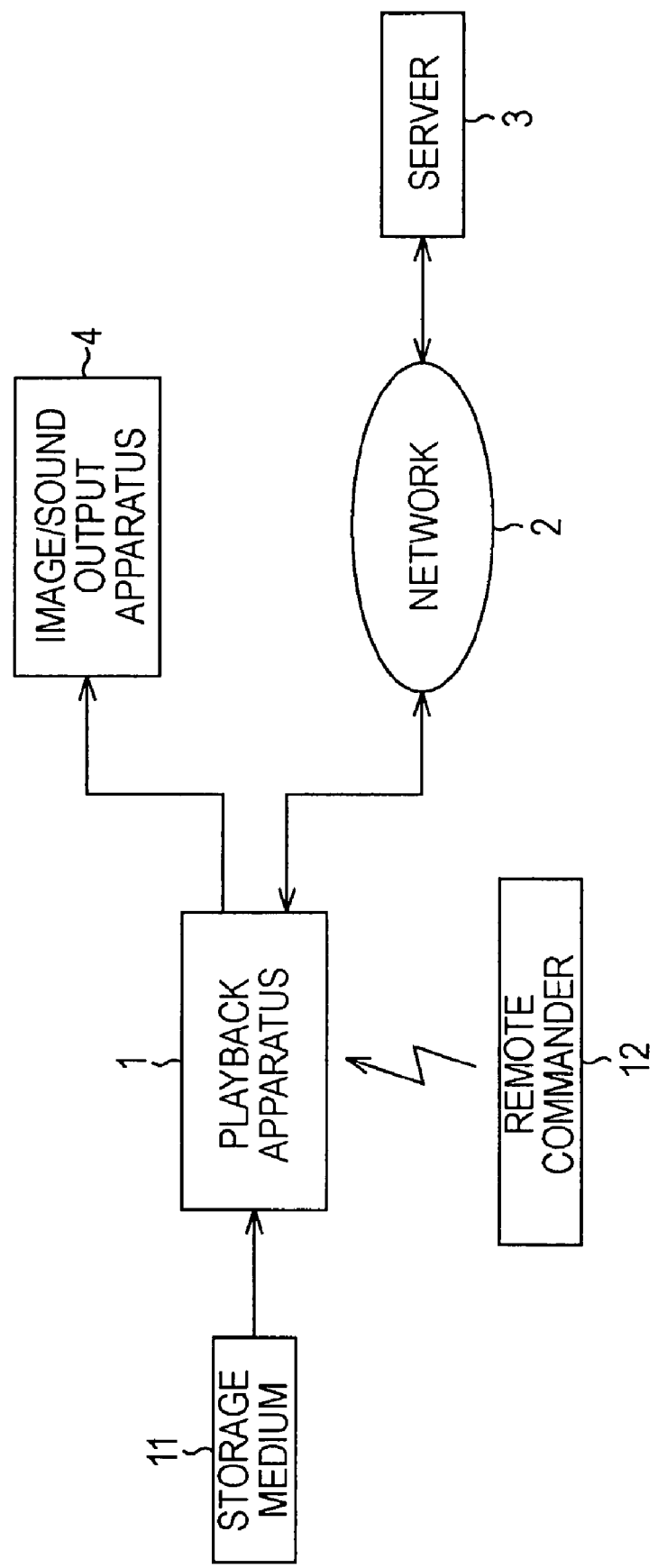
FIG. 2 is a diagram illustrating a system using a playback apparatus according to the present invention.

A system using a playback apparatus 1 according to the present invention is described below with reference to FIG. 2.

The playback apparatus 1 is configured such that a storage medium 11 such as an optical disk is mountable, and content data such as movie content data including image data and audio data is read from the storage medium 11 in accordance with a signal transmitted from a remote commander 12 operated by a user, and resultant image data and audio data are output to an image/sound output apparatus 4 thereby outputting a corresponding image and sound/voice.

The playback apparatus 1 is capable of communicating with a server 3 via a network 2 to download content data from the server 3.

Figure 3:
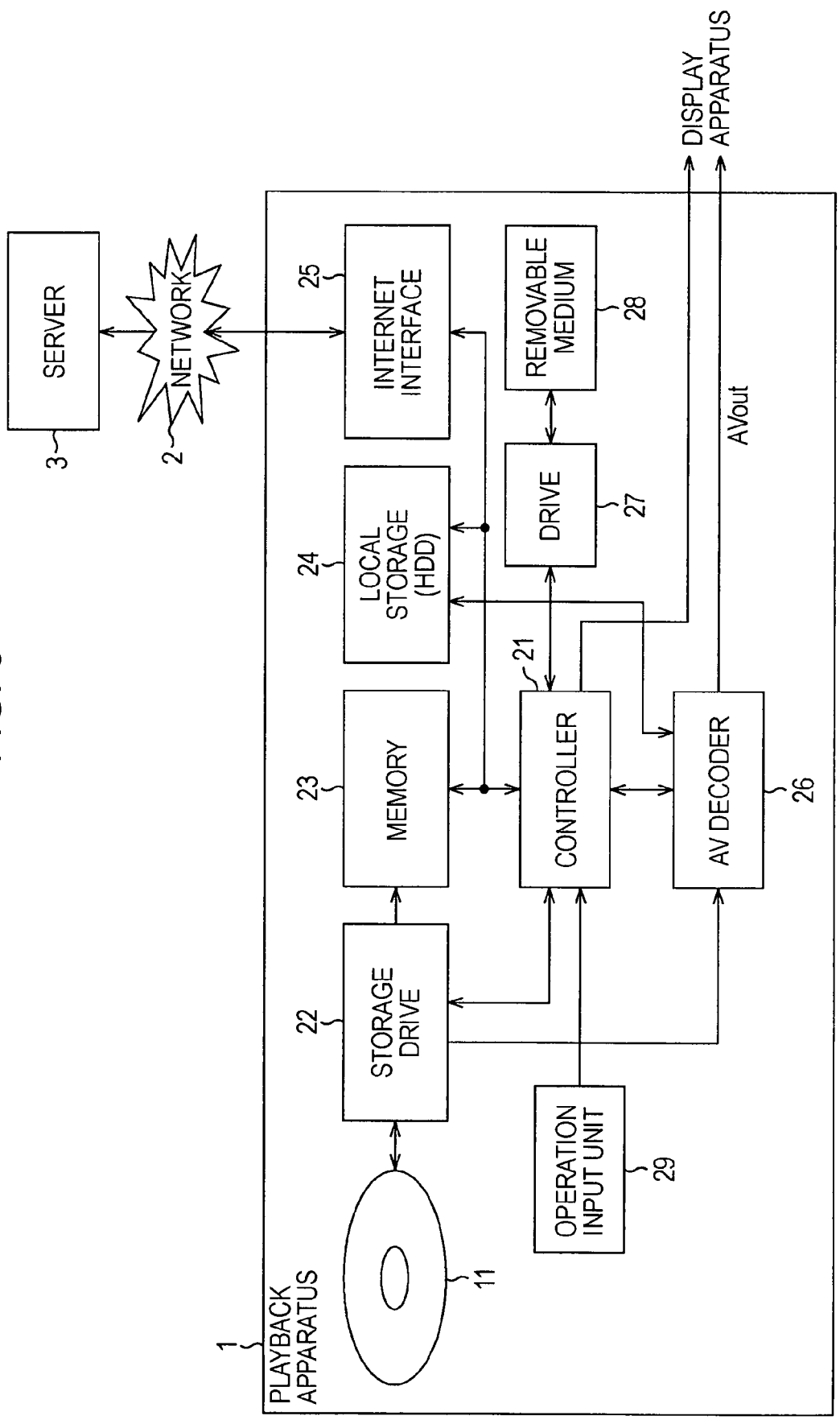
FIG. 3 is a block diagram illustrating an example of a configuration of a playback apparatus according to the present invention.

FIG. 3 is a block diagram illustrating an example of a configuration of the playback apparatus 1 according to the present invention.

A controller 21 controls operations over the whole playback apparatus 1 by executing a preinstalled control program or by loading a navigation program (described later) into a memory 23 from the storage medium 11 via a storage drive 22 and executing the loaded navigation program. More specifically, for example, when the storage medium 11 is mounted, the controller 21 may display a menu screen on an external display device (image/sound output apparatus 4).

Under the control of the controller 21, the storage drive 22 reads data from the storage medium 11 and outputs the read data to the controller 21, the memory 23 or an AV decoder 26. In a case where information read by the storage drive 22 from the storage medium 11 is a navigation program or a PlayList, the information is output to the controller 21 or the memory 23. On the other hand, when information read by the storage drive 22 from the storage medium 11 is AV stream data or text data, the information is output to the AV decoder 26.

Figure 4:
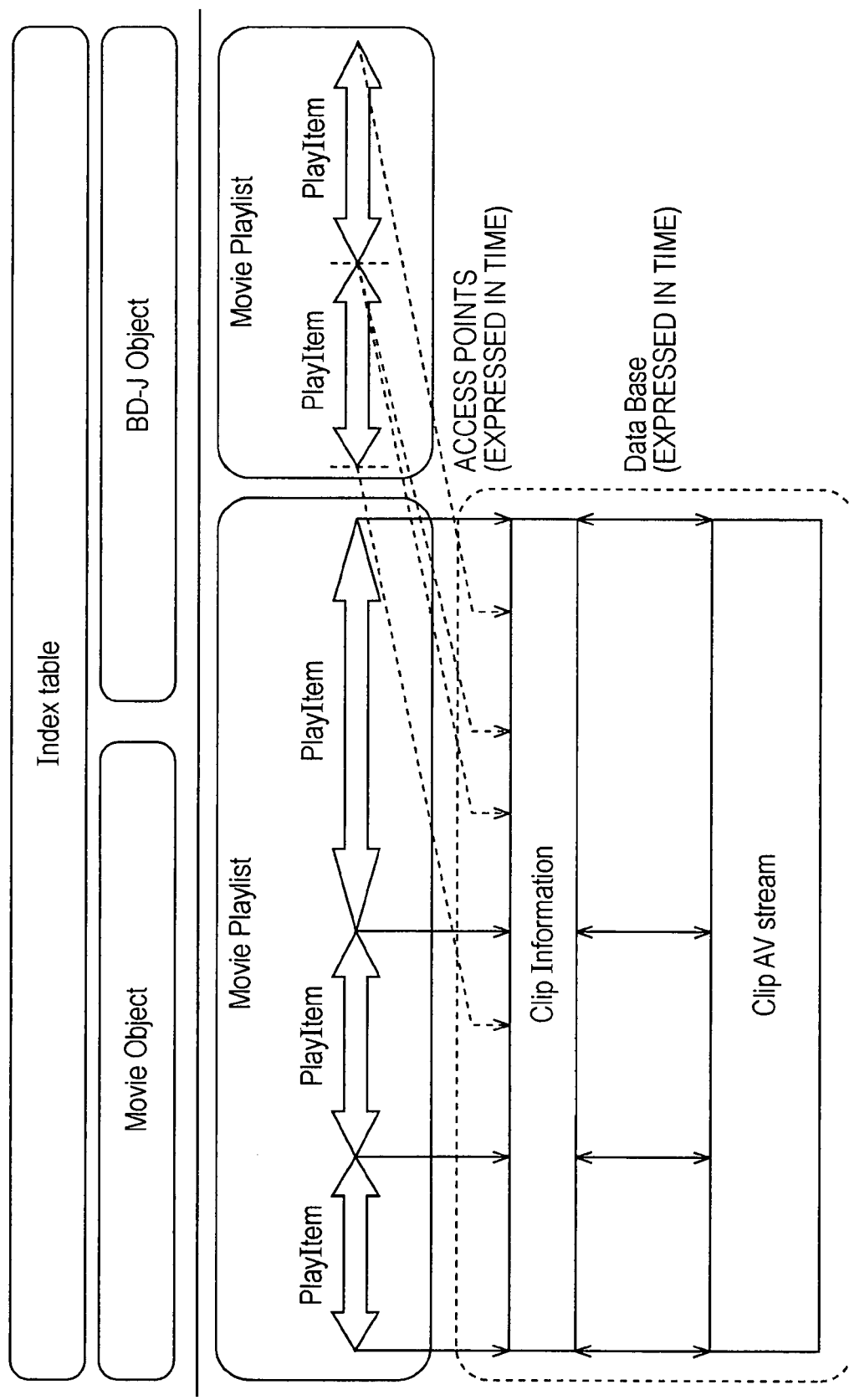
FIG. 4 is a diagram illustrating an example of an application format of information playable by the playback apparatus shown in FIG. 3.

FIG. 4 shows an example of an application format of information played back by the playback apparatus 1 shown in FIG. 3, such as data recorded on the storage medium 11 mounted on the playback apparatus 1, data supplied to the playback apparatus 1 via a network 2, data stored in an internal storage medium disposed in the playback apparatus 1, etc.

The application format includes two layers, that is, a Playlist (Movie PlayList) layer and a Clip layer thereby to manage AV (audio-visual) stream data. In the present specification, a combination of one piece of AV stream data and Clip information associated therewith is treated as an object, and such an object is referred to as a Clip. Hereinafter, AV stream data will also be referred to as an AV stream file, and Clip information will also be referred to as a Clip information file.

In general, files used by a computer or the like are treated in the form of a sequence of bytes. A content of an AV stream file is loaded along a time axis (playback time axis), and an access point of a Clip is specified by a presentation time stamp or an arrival time stamp described in a PlayList. Thus, the PlayList and the Clip are layers for managing AV stream data.

When an access point in a Clip is specified by a time stamp described in a PlayList, a Clip Information file is used to find out address information indicating a point at which to start decoding of an AV stream file.

A PlayList is a collection of playback segments of AV stream data. Each playback segment of the AV stream data is referred to as a PlayItem, and is specified by a combination of an IN point (playback start point) and an OUT point (playback end point) along the time axis. Thus, the PlayList includes one or more PlayItems.

In the example shown in FIG. 4, a PlayList shown on the left-hand side of the figure includes three PlayItems respectively pointing to a first part, a middle part, and an end part of an AV stream included in a Clip. A PlayList on the right-hand side of the figure includes two PlayItems respectively pointing to particular parts of the AV stream included in the Clip.

An Index Table is for defining content titles and menus associated therewith, and includes entry points corresponding to respective titles and menus. A navigation program includes an Index table and a Movie Object and/or a BD-J Object read by the Index Table.

The Movie Object and the BD-J Object control interactive playback of PlayLists. The Movie Object and the BD-J Object also have a capability of display a menu screen for use by a user to various playback commands. The BD-J Object is described in a programming language such as Java (registered trademark).

For example, if a leftmost PlayItem in the left-hand PlayList is specified as information indicating a playback position by the Move Object or the BD-J Object shown in FIG. 4, the first part of the AV stream included in the Clip, pointed to by this PlayItem, is played back. As described above, the PlayList is used as playback management information for managing playback of an AV stream file.

In some cases, a Movie Object or a BD-J Object includes navigation commands to control playback of an AV stream file.

The navigation commands may be stored on the storage medium 11, an internal hard disk (a local storage 24), or the like separately from the stream data, and may be preloaded by the playback apparatus 1 and supplied to the controller 21. Alternatively, the navigation commands may be embedded in stream data and stored on the storage medium 11, the internal hard disk (the local storage 24), or the like, and may be loaded by the playback apparatus 1 when the stream data is played back, and supplied to the controller 21.

Data (Clip) corresponding to each PlayItem may be recorded in advance on the storage medium 11, or may be downloaded as additional data (uploaded data) from the server 3 via the network 2 or otherwise may be acquired using a removal medium (such as a removal medium 28 shown in FIG. 3).

The explanation is further continued referring again to FIG. 3.

The memory 23 stores data necessary in execution of various processes performed by the controller 21. The local storage 24 is realized, for example, by a HDD (Hard Disk Drive).

An Internet interface 25 is connected to the network 2 via a cable or wirelessly and operates under the control of the controller 21 such that the Internet interface 25 communicates with the server 3 via the network 2 and supplies data downloaded from the server 3 to the local storage 24. More specifically, for example, data is downloaded from the server 3 thereby updating the data stored on the storage medium 11 mounted on the playback apparatus 1 as described above with reference to FIG. 4. The content downloaded from the server 3 via the network 2 may be stored in the local storage 24.

The AV decoder 26 decodes the AV stream or text data supplied from the storage drive 22 or the local storage 24, and outputs a resultant video signal and an audio signal to the external display device (the image/sound output apparatus 4). In accordance with the decoded signals supplied from the AV decoder 26, the display device outputs the content stored on the storage medium 11 (that is, an image is displayed and a sound/voice is output).

An operation input unit 29 includes, for example, an input device including buttons, keys, a touch panel, a jog dial, and/or a mouse and a receiving unit adapted to receive a signal such as an infrared signal transmitted from the remote commander 12, whereby a command/data input by an operation performed by a user is acquired and supplied to the controller 21.

The controller 21 is also connected to a drive 27 as required, and a removable medium 28 such as a magnetic disk (for example, a flexible disk), an optical disk (for example, a CD-ROM (Compact Disk-Read Only Memory), a DVD, etc.), a magneto-optical disk (for example, a MD (Mini-Disk (registered trademark)), or a semiconductor memory is mounted on the drive 27.

Now, a method of playing back data stored on the storage medium 11 mounted on the playback apparatus 1 or data stored in the local storage 24 is described below.

The playback apparatus 1 includes the local storage 24 such as a HDD (Hard Disk Drive) disposed in the playback apparatus 1. The playback apparatus 1 is connected to the network 2 via a cable or wirelessly whereby a content may be downloaded from the server 3 via the network 2 and the downloaded content may be stored in this local storage 24. For example, data is downloaded from the server 3, and the data stored on the storage medium 11 mounted on the playback apparatus 1 is updated in accordance with the downloaded data.

In the state in which the downloaded content is stored in the local storage 24, if a command to play back the content stored on the storage medium 11 is issued via the operation input unit 29, the controller 21 relates the content stored on the storage medium 11 to the content stored in the local storage 24 and performs a content playback process.

More specifically, the controller 21 refers to a PlayList stored in the storage medium 11 or the local storage 24 and reads a Clip AV Stream from the storage medium 11 or the local storage 24 in accordance with Clip Information associated with a Clip pointed to by a PlayItem in the PlayList. The Clip AV Stream is supplied to the AV decoder 26 and decoded thereby. The resultant decoded data is supplied to the image/sound output apparatus 4 and played back thereby.

As described above, although actual image data and audio data are stored in the form of a Clip AV Stream, the data stored on the storage medium 11 mounted on the playback apparatus 1 and the data stored in the local storage 24 are in the hierarchical structure, and it is possible to control the playback operation in non-normal modes in accordance with the PlayLists and PlayItems by which to manage the actual data along the time axis, without having to refer to the actual data (actual image and audio data).

Figure 5:
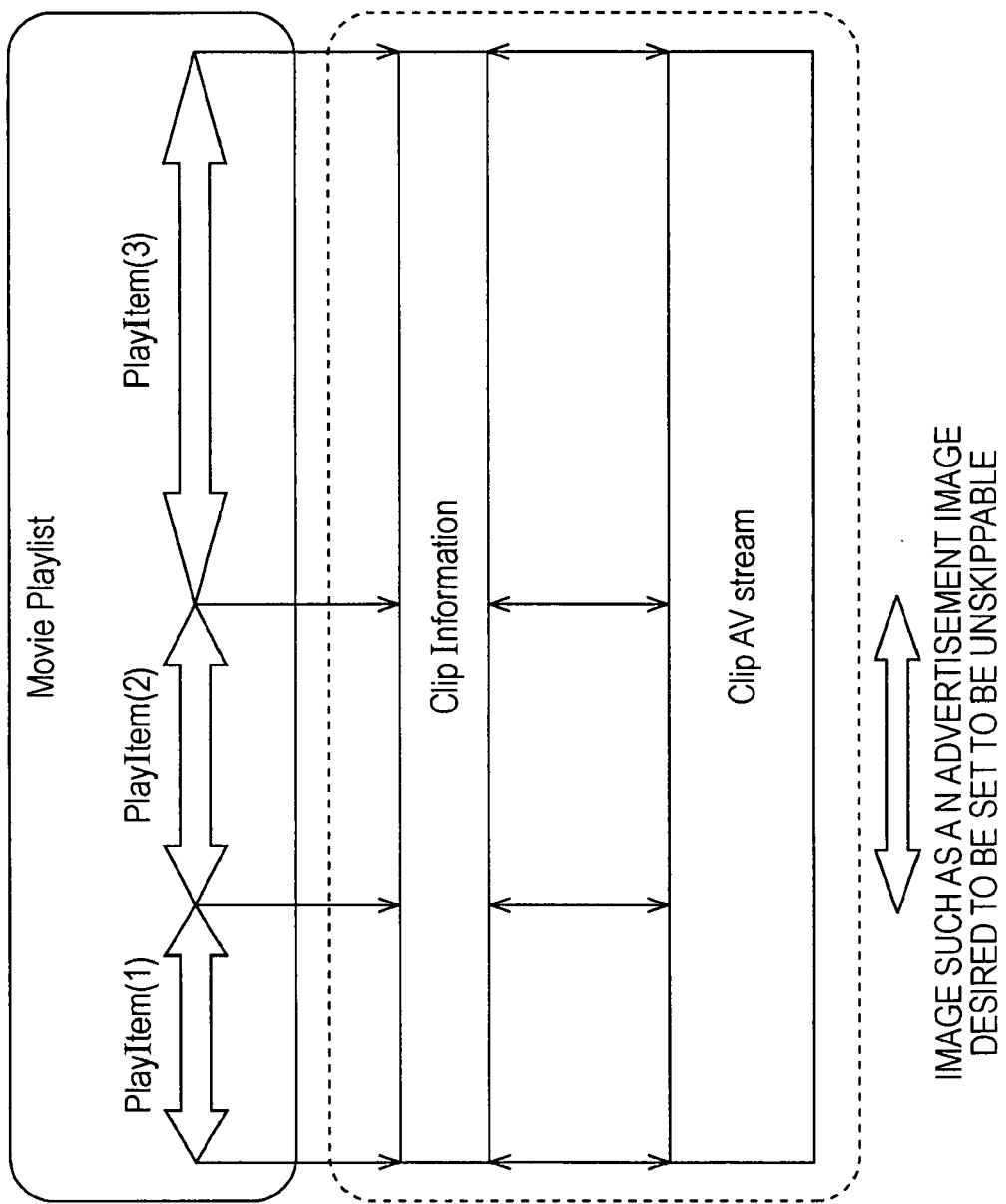
FIG. 5 is a diagram illustrating an image which is included in a stream and which is desired to be set such that skipping of this image by a fast-forward operation is prohibited.

More specifically, for example, as shown in FIG. 5, when a stream includes an image such as an advertisement image (Clip AV stream pointed to by PlayItem(2) in the example shown in FIG. 5) which is desired to be set such that a fast-forward operation or the like is prohibited for that image, this requirement can be achieved by describing (setting) information in a PlayList and a PlayItem so that non-normal playback operations such as a fast-forward/backward operation, a jump from a particular position, etc. are prohibited and the image of interest is played back without being skipped or scanned in the fast-forward mode.

FIG. 6 shows a data structure of a PlayList file. The PlayList File is a data file having an extension ".mpls" and stored in a directory PLAYLIST of the storage medium 11 mounted on the playback apparatus 1 or of the local storage 24.

In a type_indicator field, information indicating the type of the present file is described. More specifically, in this field, information is described to indicate that this file is a PlayList (MoviePlayList) for managing playback of the image.

In a version_number filed, four characters are stored to indicate a version number of the present file, that is, xx.mpls (MoviePlayList).

PlayList_start_address indicates the start address of PlayList( ) expressed in units of bytes as counted from the beginning of the PlayList file.

PlayListMark_start_address indicates the start address of PlayListMark( ) expressed in units of bytes as counted from the beginning of the PlayList file.

ExtensionData_start_address indicates the start address of ExtensionData( ) expressed in units of bytes as counted from the beginning of the PlayList file.

In AppInfoPlayList( ), parameters associated with playback control such as restriction on playback are stored. The details of AppInfoPlayList( ) will be described later with reference to FIG. 7.

In PlayList( ), parameters associated with a main path and a subpath of the PlayList are stored. The details of PlayList( ) will be described later with reference to FIG. 8.

In PlayListMark( ), mark information associated with the PlayList is stored. More specifically, information associated with a mark indicating a jump destination (jump point) of a jump such as a chapter jump specified by a user operation or a command is stored in PlayListMark( ). The mark is allowed to be set absolutely independently of the range of PlayList or PlayItem. Hereinafter, a mark indicating a jump destination (jump point) specified by a user operation or a command will also be referred to as a "Entry mark". The details of PlayListMark( ) will be described later with reference to FIG. 10.

In ExtensionData( ), private data is allowed to be inserted as required.

Now, AppInfoPlayList( ) is described with reference to FIG. 7.

In a length field, the length of syntax as measured from the end of the length field is described. More specifically, in the length field, information is described to indicate the length in bytes from a point directly after the end of this field to the end of a reserved_for_future_use field located at the end of AppInfoPlayList( ). After the length field, a reserved_for_future_use field with a 8-bit length is plaed.

In a Playlist_playback_type field, information is described to indicate whether the present Playlist should be played back in one of modes including a continuous mode, a random access mode, and a shuffle mode.

When the present Playlist is specified to be played back in the random access mode or the shuffle mode, information is described in a Playback_count filed to indicate the number of Playitems to be played back.

UO_mask_table( ) describes information indicating restrictions on non-normal playback operations performed in response to user operations, such as a pause, chapter search, a jump, a fast-forward operation, a fast-backward operation, or a non-normal display operation.

In the present embodiment, for example, non-normal playback operations include a Forward Play operation and a Backward Play operation (including a fast-backward operation) performed at a non-normal speed in accordance with a user input operation, a Chapter Search operation performed in accordance with a user input operation to start playback from a chapter corresponding to a specified chapter number, a Time Search operation performed in accordance with a user input operation to start playback from a playback position specified in passage time (for example, a passage time in minutes and seconds in the normal playback mode), a Skip to Next Point operation performed in accordance with a user input operation to start playback from a chapter point at a position temporally following the current playback position, and a Skip Back to Previous Point operation performed in accordance with a user input operation to start playback from a chapter point at a position temporally previous to the current playback position.

In the case of the forward/backward playback operation at non-normal speeds, such as a "2× play operation" or "−2× play operation", performed using a variable of time, frames are skipped depending on the specified playback speed, and thus jumping of playback position occurs. Thus, in the present description, the forward playback operation at non-normal speeds, the backward playback operation at non-normal speeds, and the point jump (which is performed without using a variable of time and which simply jumps to the beginning of a chapter or a PlayItem) are generically referred to as "jump".

The playback apparatus 1 may provide further extension user operations specific to the apparatus.

In AppInfoPlayList( ) shown in FIG. 7, UO_mask_table( ) includes, as shown in FIG. 28, information indicating whether to permit above-described respective user operations to be performed when a Clip AV Stream is being played back while referring to a PlayList.

Referring FIG. 28, UO_mask_table( ) is described below.

Information, chapter_search_mask, indicates whether to allow the Chapter Search operation to be performed when requested by a user operation to move the playback position to a chapter corresponding to a specified chapter number. Information, time_search_mask, indicates whether to allow the Time Search operation to be performed when requested by a user operation to move the playback position to a specified point expressed in time (elapsed playback time in minutes and seconds in the normal playback mode).

Information, skip_to_next_point_mask, indicates whether to allow the Skip to Next Point operation to be performed when requested by a user operation to move the playback position to a chapter which appears temporally following the current playback position. In formation, skip_back_to_previous_point_mask, indicates whether to allow the Skip Back to Previous Point operation to be performed when requested by a user operation to move the playback position to a chapter which appears temporally prior to the current playback position. Information, forward_play_mask, indicates whether to allow the fast-forward (Forward Play) operation. Information, backward_play_mask, indicates whether to allow a backward playback (Backward Play) operation (including a fast-backward operation).

The explanation is further continued referring again to FIG. 7.

PlayList_random_access_flag is flag information for controlling a jump operation from another Playlist. More specifically, when PlayList_random_access_flag=1, the jump operation from another Playlist is prohibited.

The playback apparatus 1 may provide extension user operations specific to the apparatus. An example is a command to move the playback position from a point pointed to by the current PlayList to the beginning or a particular chapter position of a PlayItem pointed to by another PlayList. PlayList_random_access_flag is flag information which defines whether, when one of such extension user operations is performed to request a jump of the playback position from a point of a Clip AV stream pointed to by another PlayList into a Clip AV stream pointed to by the current PlayList, the user operation should be accepted or not. The user operations and PlayList_random_access_flag will be described in further detail later.

Note that in a case where a jump (a change in playback position) is requested not by a user operation but a navigation command, PlayList_random_access_flag is ignored (that is, the jump requested by the navigation command is executed regardless of PlayList_random_access_flag, and the playback position is changed in accordance with the jump command).

Audio_mix_app_flag is a flag indicating whether the current PlayList needs synthesis of a sound/voice or a sound effect. Lossless_may_bypass_mixer_flag is a flag associated with lossless playback of audio data. After Lossless_may_bypass_mixer_flag, there is a 13-bit reserved space named reserved_for_future_use.

Referring to FIG. 8, syntax of PlayList( ) is described below.

In a length field, a 32-bit unsigned integer is stored to indicate the length in bytes from a position immediately after this length field to the end of PlayList( ). That is, the integer stored in this length field indicates the length in bytes from reserved_for_future_use to the end of Playlist. After this length field, there is a 16-bit reserved space named reserved_for_future_use. A number_of_PlayItems field is a 16-bit field for describing the number of PlayItems in the Playlist. In the example shown in FIG. 5, there are three PlayItems. PlayItem_id is assigned a value starting from 0 in the order in which PlayItem( ) appears in the Playlist.

A number_of_SubPaths field is a 16-bit field for indicating the number of SubPaths (the number of entries) existing in the Playlist. A playback path given by a sequence of one or more PlayItems (at directly adjacent positions) in the PlayList is referred to as Main Path. A playback path given by a sequence of one or more Sub Paths (that is, a sequence of one or more SubPlayItems which may or may not be directly adjacent to each other) in parallel to the Main Path is referred to as Sub Path.

In a "for" sentence following the above, PlayItems are referred to as many times as there are PlayItems, and Sub Paths are referred to as many times as there are SubPaths.

Now, referring to FIG. 9, syntax of PlayItem( ) is described below.

In a length field, a 16-bit unsigned integer is stored to indicate the length in bytes from a position immediately after this length field to the end of PlayItem( ). Clip_Information_file_name[0] is a filed for specifying a Clip pointed to by the PlayItem. In the example shown in FIG. 9, a main Clip AV stream file is pointed to by Clip_Information_file_name[0]. PlayItem( ) also includes Clip_codec_identifier[0] specifying a codec method of the Clip, a reserved_for_future_use field reserved for future extended use, an is_multi_angle flag indicating whether multiangle playback is supported, a connection_condition field for describing information associated with a connection condition, and a ref_to_STC_id[0] field for describing formation associated with a discontinuous STC point (a discontinuous point in system timebase). PlayItem( ) also includes IN_time and OUT_time specifying a range, to be played back, of the Clip of the PlayItem. In the example shown in FIG. 9, a range to be played back of the AV stream file of the main Clip is specified by IN_time and OUT_time.

PlayItem( ) also includes UO_mask_table( ) for restricting acceptance of a user input operation and PlayItem_random_access_flag for controlling a jump playback operation from another PlayIterm.

In FIG. 9, in UO_mask_table( ) of PlayItem( ), as described above with reference to FIG. 28, information indicating whether to permit above-described respective user operations to be performed when a Clip AV Stream is being played back while referring to a PlayItem.

In FIG. 9, PlayList_random_access_flag of PlayItem( ) indicates whether, when a jump (movement of the playback position) to a point in a Clip AV Stream pointed to by the present PlayItem from a point in a Clip AV Stream pointed to by another PlayItem is requested by the user operation, the requested jump should be prohibited or not. In the present embodiment, when PlayItem_random_access_flag is set to 1, jump from another PlayItem is prohibited. This flag will be described in further detail later.

Note that in a case where a jump (a change in playback position) is requested not by a user operation but a navigation command, PlayItem_random_access_flag is ignored (that is, the jump command is executed regardless of PlayItem_random_access_flag and the playback position is changed in accordance with the jump command).

PlayItem( ) further includes information, still_mode, indicating whether a video image displayed lastly is displayed as a still image. Although there can be a plurality of is_multi_angle (is_multi_angle==1), further explanation thereof is omitted herein, because such a situation does not have a directly relation to the present invention.

STN_table( ) makes provides a mechanism of, when PlayItem and associated one or more SubPaths are given, selecting a Clip pointed to by PlayItem and a SubPath to perform a Clip pointed to by the selected SubPath thereby allowing a user to switch a sound/voice mode or a subtitle.

Next, referring to FIG. 10, syntax of PlayListMark( ) is described below.

A length field is a 32-bit field for describing the length in bytes from a position immediately after this length field to the end of PlayListMark( ).

In a number_of_PlayList_marks field, a 16-bit unsigned integer is stored to indicate the number of marks (including those corresponding to chapters) included as entries in PlayListMark( ).

In a "for" sentence following the above, PlayListMark is referred to as many times as there are marks.

A value, PL_Mark_id, is used in the "for" sentence to identify each mark. A number sequentially varying from 0 is assigned to PL_Mark_id.

A mark_type field has a length of 8 bits and is used to define the type of the corresponding mark. An example of mark types is Entry Mark. In a case where a mark of interest is an Entry mark and this mark is referred to in response to an occurrence of a user operation or a command, the Entry Mark defined in the PlayListMark points to a jump destination when the Chapter Search operation, the Skip to Next Point operation, or the Skip Back to Previous Point operation is performed.

In the Chapter Search operation, Chapter Numbers having different values equal to or greater than 1 are assigned to the respective Entry Marks so that a user is allowed to specify desired Entry Mark by a Chapter Number.

A ref_to_PlayItem_id field has a length of 16 bits and is used to identify PLayItem_id of PLayItem in which the mark of interest exists.

A mark_time_stamp field has a length of 32 bits and is used to indicate the position of the mark by a passage time (playback time) from In_time of the PlayItem. Note that it is required that mark_time_stamp be defined between In_time and OUT_Time of the PlayItem.

Note that marks (Entry Marks) are allowed to be set at arbitrary positions absolutely independent of ranges of PlayList and PlayItem.

Furthermore, PlayListMark( ) includes entry_ES_PID and duration.

In the data structure described above, PlayLists do not necessarily correspond to actual video images (Clip AV Stream) in an one-to-one fashion. Therefore, even if a flag is set so that non-normal playback operations are prohibited in a PlayItem corresponding to a particular Clip, there is a possibility that a jump from another PlayList to some Entry mark or to the beginning of some PlayItem is accepted without being prohibited. To avoid the above problem, in addition to PlayItem_random_access_flag defined for the PlayItem, PlayList_random_access_flag is also set for the PlayList to define whether a jump from another PlayList is permitted, thereby doubly checking the permission/prohibition of jumps.

Thus, the hieratical management of playback of Clip AV streams using PlayLists and PlayItems makes it possible to correctly control non-normal playback operations along the time axis simply according to PlayLists and PlayItems without concern for the actual data (Clip AV Stream).

Figure 11:
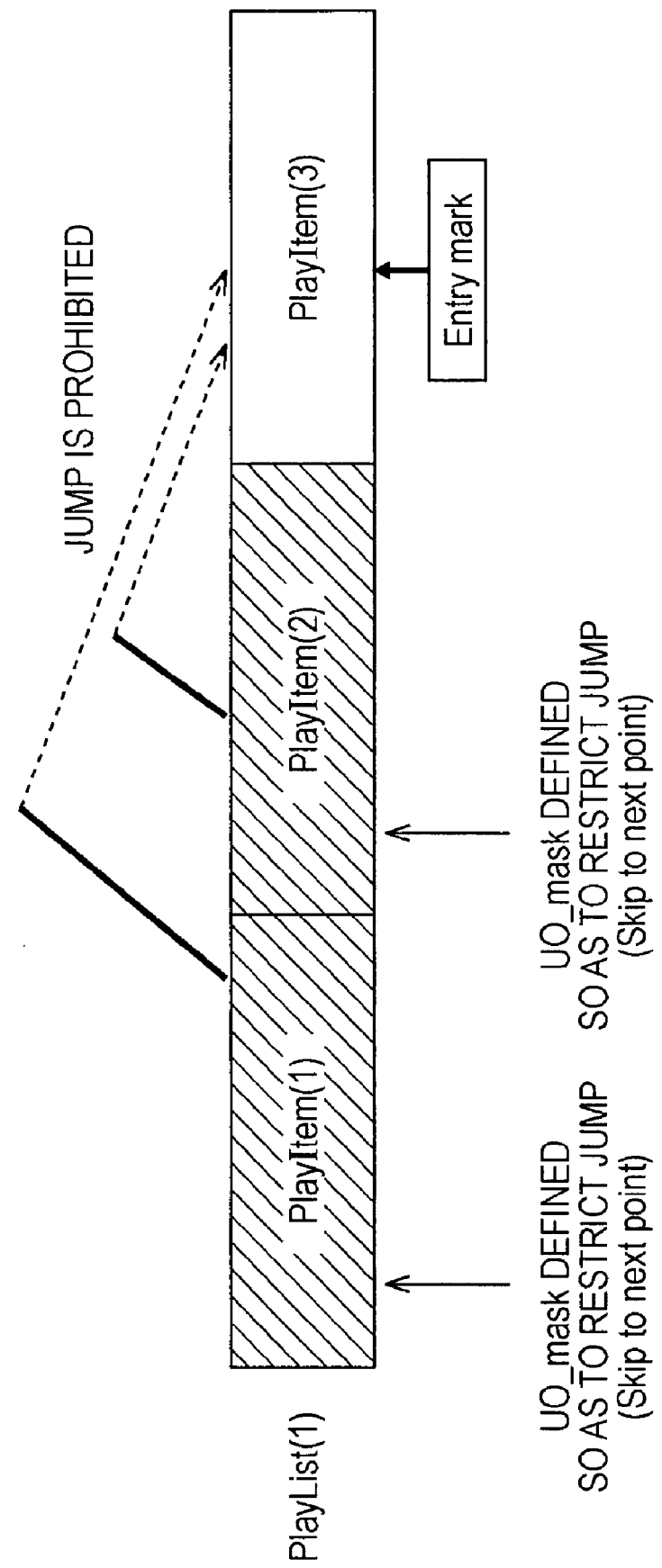
FIG. 11 is a diagram illustrating a restriction on a non-normal playback operation, defined by UO_mask of PlayItem.
Figure 12:
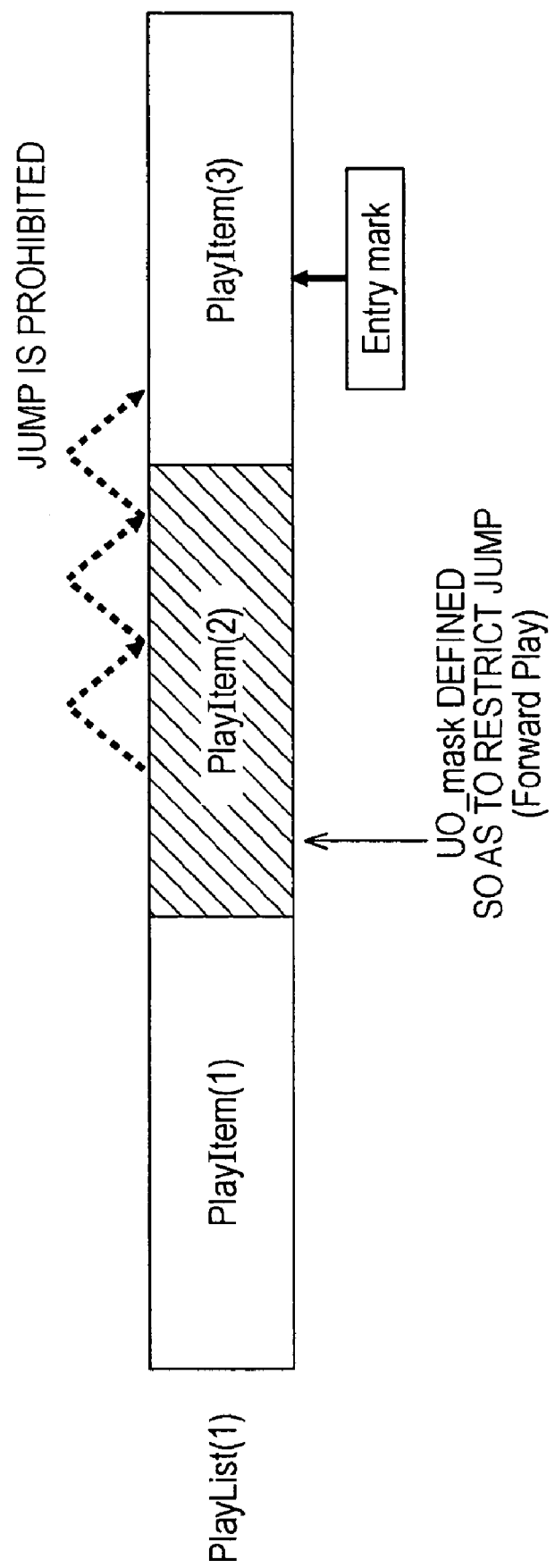
FIG. 12 is a diagram illustrating a restriction on a non-normal playback operation, defined by UO_mask of PlayItem.

Next, referring to FIGS. 11 and 12, described is a manner of restricting non-normal playback operations by defining UO_mask of PlayItem (by defining UO_mask_Table( ) to indicate whether user operations are permitted or prohibited).

As described above, UO_mask defines whether non-normal playback operations such as pause, chapter search, jump, fast-forward, fast-backward or display operations are permitted or prohibited when a user operation occurs to request execution of one of these operations.

For example, as shown in FIG. 11, in a case where the Skip to next Point (jump) operation is prohibited in UO_mask_table of PlayItem(1) and in UO_mask_table of PlayItem(2), and next Entry Mark is defined in PlayItem(3), jumping to the Entry Mark of PlayItem(3) from any playback position of any of PlayItem(1) and PlayItem(2) is prohibited.

For example, as shown in FIG. 12, when restriction on jumping is defined such that the fast-forward (Forward Play) operation is prohibited in PlayItem(1), the fast-forward operation is prohibited for from any playback position of PlayItem(2).

In the examples shown in FIGS. 11 and 12, restrictions on non-normal playback operations are defined in UO_mask_table of PlayItems. Restrictions are defined in UO_mask of PlayLists in a similar manner. When a Clip AV stream pointed to by a PlayList is being played back, any non-normal playback operation (jump operation) which is set as being unacceptable is prohibited even if a request for the operation is issued by a user.

Figure 13:
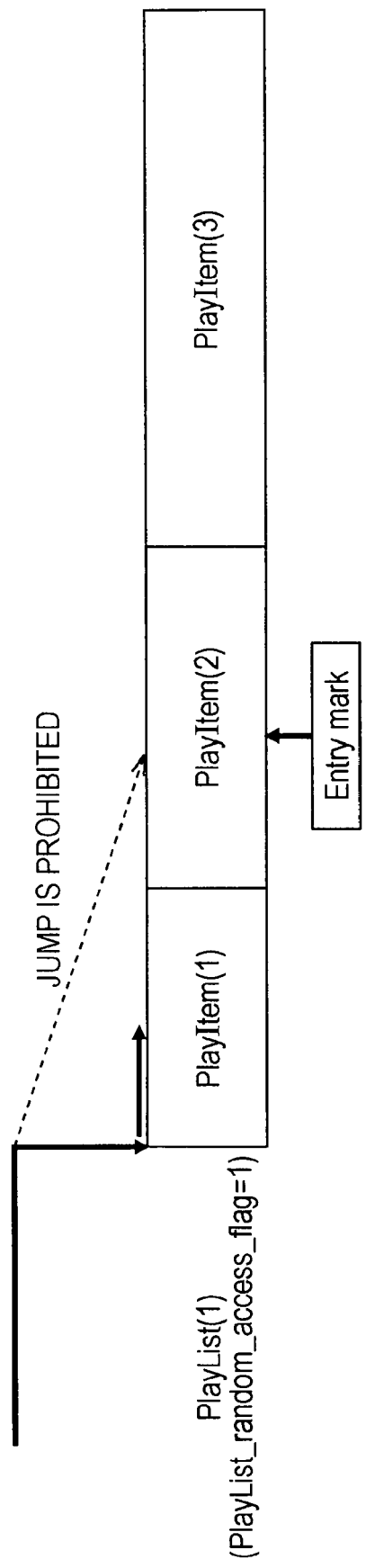
FIG. 13 is a diagram illustrating PlayList_random_access_flag.

Next, referring to FIG. 13, PlayList_random_access_flag is described.

When PlayList_random_access_flag is set to 1 for PlayList (1) and an Entry Mark is defined in PlayItem(2) as shown in FIG. 13, if a user operation occurs to request a jump to the Entry Mark of PlayItem(2) when the Clip AV stream pointed to by another PlayList is being played back, the playback position is moved not to the Entry Mark in PlayItem(2) but to the beginning of the Clip AV stream pointed to by PlayList(1).

Not only in the case where a jump to the Entry Mark defined in the PlayList is requested, but also in a case where a jump to the beginning of any PlayItem is requested, the playback position is moved not to the beginning of the specified PlayItem in PlayList(1) but to the beginning of PlayList (1) if PlayList_random_access_flag is set to 1 for PlayList(1).

Note that not only in the case where a user operation occurs to request a jump when another PlayList is being played back, but also in a case where a user operation occurs to request a jump to some point of a Clip AV stream pointed to by PlayList (1) for which PlayList_random_access_flag=1 when no image is being played back as in a case in which a menu is being displayed, the playback position is moved to the beginning of the Clip AV stream pointed to by PlayList(1).

When the end of Movie PlayList(1) is reached during the fast-forward operation, following Movie PlayList(2) is continuously played in the fast-forward mode or in the normal mode depending on the setting. That is, even if, in Movie Object (BD-J Object) called by an index table, it is specified that Movie PlayList(1) and Movie PlayList(2) should be played continuously (for example, definition is described, on the storage medium 11, in a part corresponding to Movie Object (BD-J Object), the operation is transferred to execution of a command of Movie Object after completion of execution of Movie PlayList(1), and thus a determination as to whether Movie PlayList(2) is also played in the fast-forward mode or not after the end of Movie PlayList(1) is reached in the fast-forward operation is made depending on the setting.

For example, even if the playback apparatus 1 has an extension function that allows a jump to a point in a PlayList in response to a request by a user operation without being restricted by UO_mask_table( ), it is not allowed to ignore PlayList_random_access_flag. That is, even if the playback apparatus 1 has a function that allows it to define an Entry Point expressed in playback time at any point and save the defined Entry Point, it is not allowed to jump to a point in a PlayList for which PlayList_random_access_flag is set to 1. In other words, even if the playback apparatus 1 has an apparatus-specific extension function that accepts a user operation of jumping to any point in PlayItem or any mark (Entry Point) in any PlayList, this user operation is restricted by PlayList_random_access_flag.

Next, referring to FIGS. 14 to 21, PlayItem_random_access_flag is described.

Note that in the examples shown in FIGS. 14 to 21, it is assumed that PlayItem_random_access_flag is set to 0 for PlayItem(1) and PlayItem(3), PlayItem_random_access_flag is set to 1 for PlayItem(2).

Figure 14:
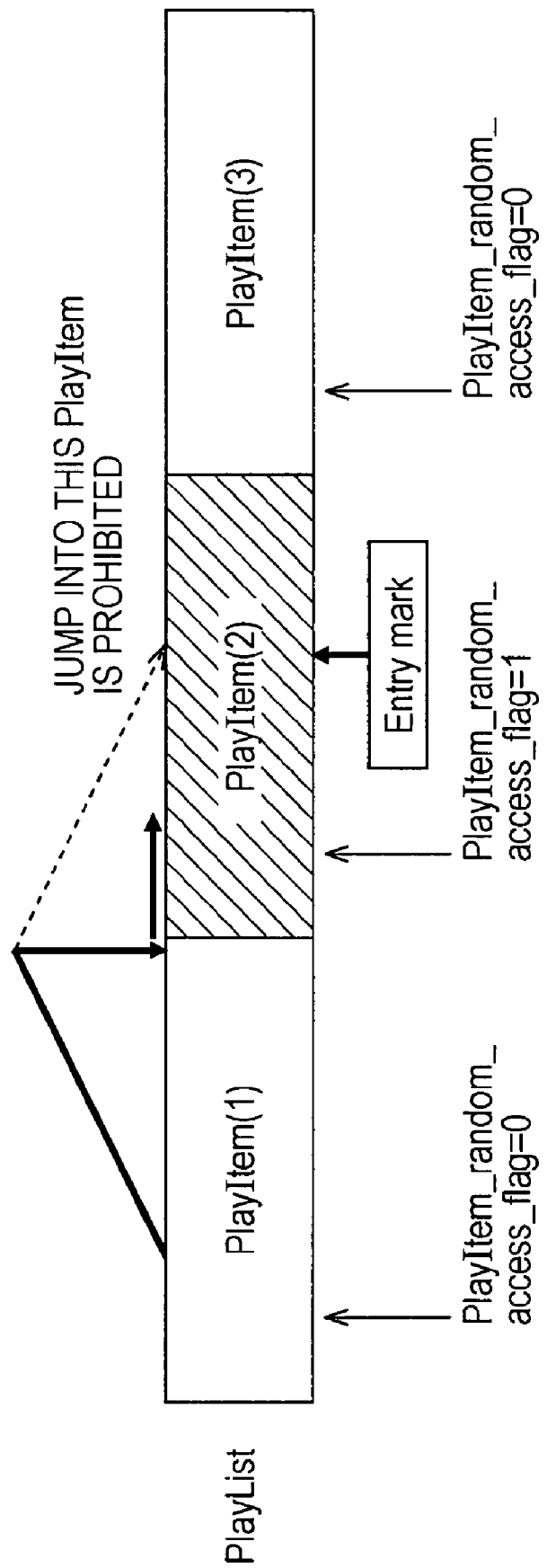
FIG. 14 is a diagram illustrating PlayItem_random_access_flag.

In the example shown in FIG. 14, an Entry Mark is defined in PlayItem(2) for which PlayItem_random_access_flag=1. When a Clip AV stream pointed to by PlayItem(1) is being played back, if a user operation occurs to request a jump to the Entry Mark in PlayItem(2), the playback position jumps not to the Entry Mark in PlayItem(2) but to the beginning of the Clip AV stream pointed to by PlayItem(2).

Figure 15:
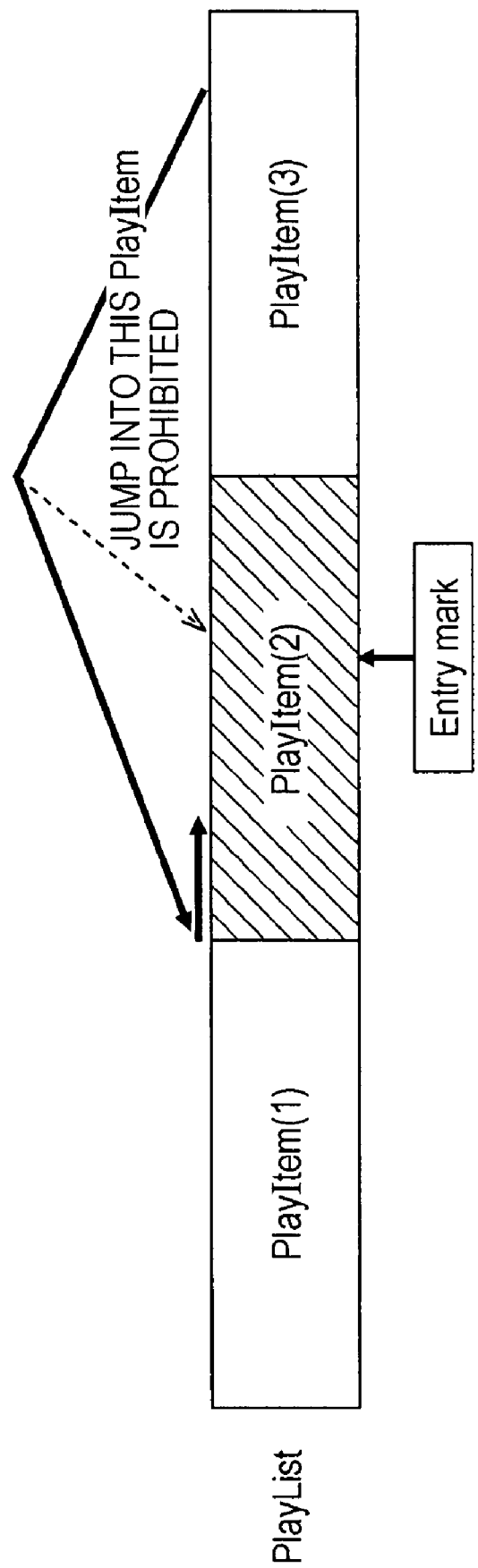
FIG. 15 is a diagram illustrating PlayItem_random_access_flag.

In the example shown in FIG. 15, an Entry Mark is defined in PlayItem(2) for which PlayItem_random_access_flag=1. When a Clip AV stream pointed to by PlayItem(3) is being played back, if a user operation occurs to request a jump to the Entry Mark in PlayItem(2), the playback position jumps not to the Entry Mark in PlayItem(2) but to the beginning of the Clip AV stream pointed to by PlayItem(2).

Figure 16:
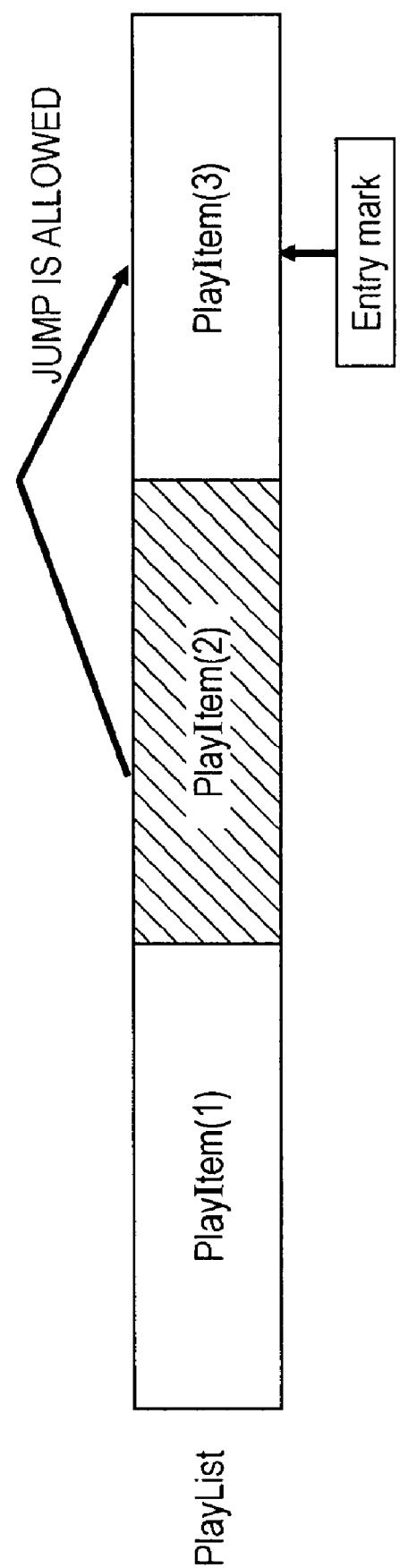
FIG. 16 is a diagram illustrating PlayItem_random_access_flag.

In the example shown in FIG. 16, an Entry Mark is defined in PlayItem(3) for which PlayItem_random_access_flag=0. When a Clip AV stream pointed to by PlayItem(2) for which PlayItem_random_access_flag is set to 1 is being played back, if a user operation occurs to request a jump to the Entry Mark in PlayItem(3), the request for the jump is accepted, and the playback position jumps to the Entry Mark in PlayItem (3).

Figure 17:
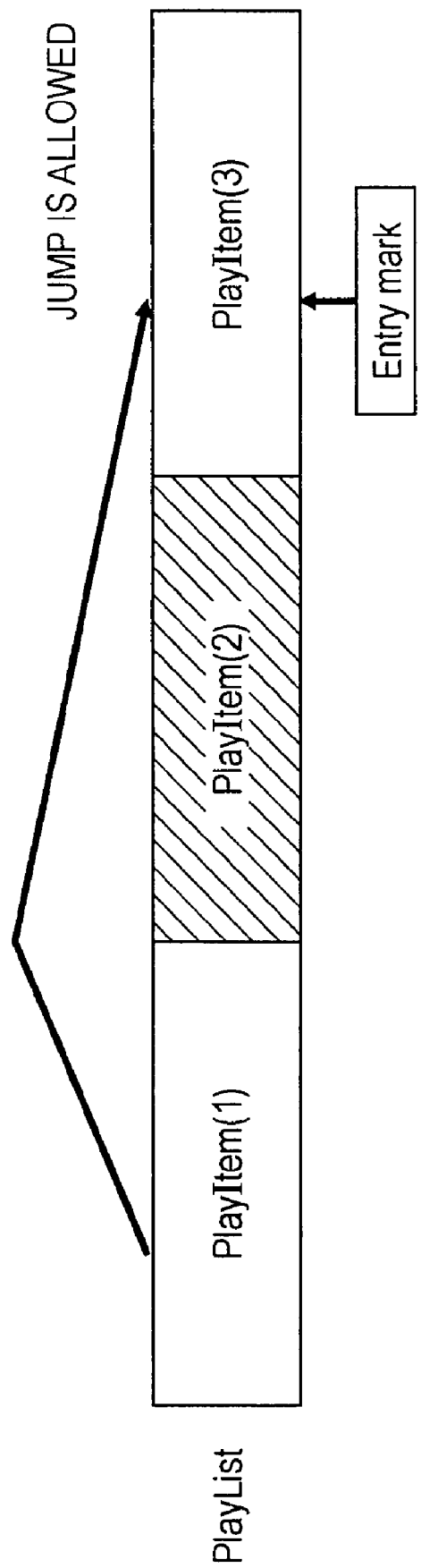
FIG. 17 is a diagram illustrating a PlayItem_random_access_flag.

In the example shown in FIG. 17, an Entry Mark is defined in PlayItem(3) for which PlayItem_random_access_flag=0. When a Clip AV stream pointed to by PlayItem(1) for which PlayItem_random_access_flag is set to 0 is being played back, if a user operation occurs to request a jump to the Entry Mark in PlayItem(3), the request for the jump is accepted, and the playback position jumps to the Entry Mark in PlayItem (3).

Figure 18:
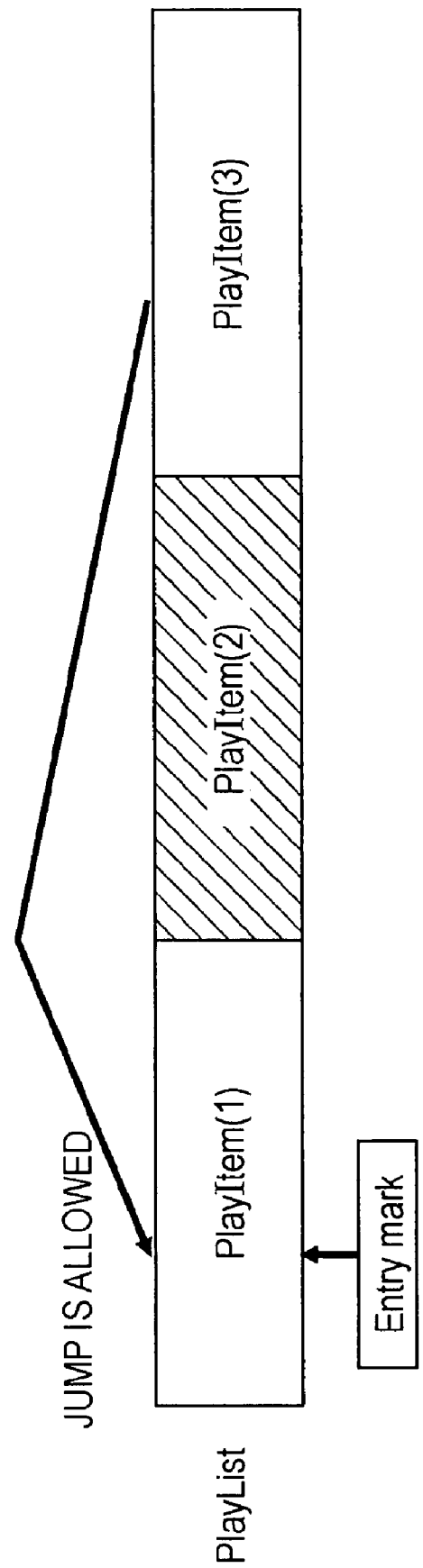
FIG. 18 is a diagram illustrating a PlayItem_random_access_flag.

In the example shown in FIG. 18, an Entry Mark is defined in PlayItem(1) for which PlayItem_random_access_flag=0. When a Clip AV stream pointed to by PlayItem(3) for which PlayItem_random_access_flag is set to 0 is being played back, if a user operation occurs to request a jump to the Entry Mark in PlayItem(1), the request for the jump is accepted, and the playback position jumps to the Entry Mark in PlayItem (1).

Figure 19:
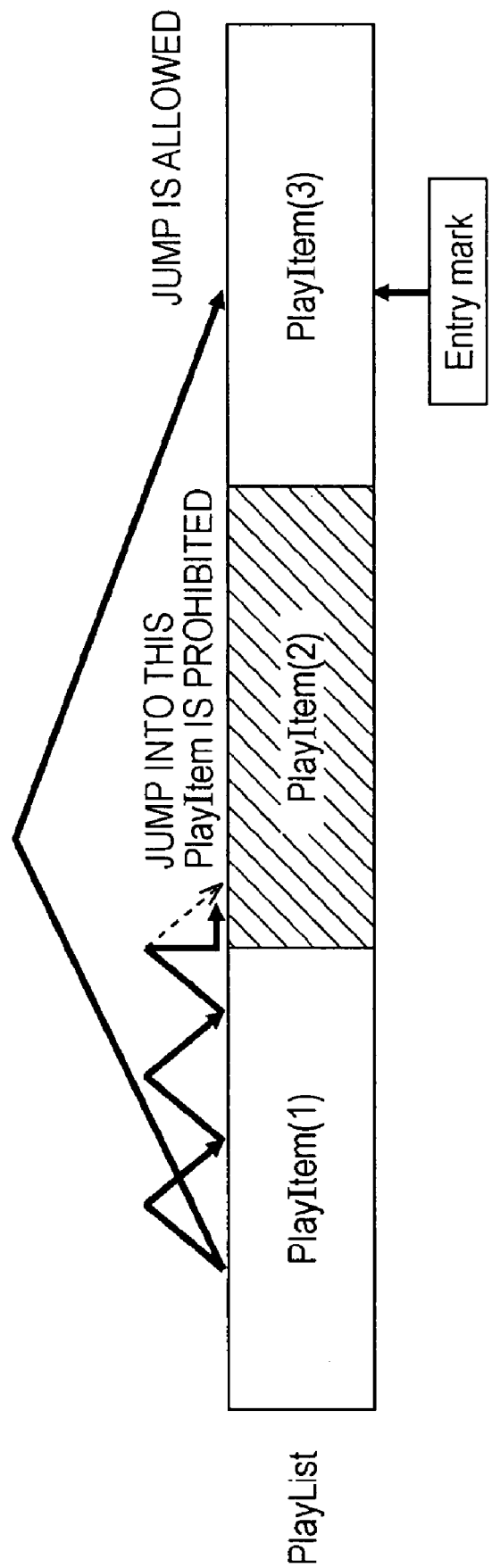
FIG. 19 is a diagram illustrating PlayItem_random_access_flag.

In the example shown in FIG. 19, an Entry Mark is defined in PlayItem(3) for which PlayItem_random_access_flag=0.

When a Clip AV stream pointed to by PlayItem(1) for which PlayItem_random_access_flag is set to 0 is being played back, if a user operation occurs to request a fast-forward operation, the fast-forward operation is permitted within PlayItem(1). However, if the playback position reaches PlayItem(2) for which PlayItem_random_access_flag=1, a further fast-forward operation is not permitted, and playback is performed from the beginning of PlasyItem(2) at a normal speed (not at a fast speed).

Note that in the example shown in FIG. 19, when a Clip AV stream pointed to by PlayItem(1) is being played back, if a jump to the Entry mark in PlayItem(3) for which PlayItem_random_access_flag is set to 0 is requested, the request for the jump is accepted.

Figure 20:
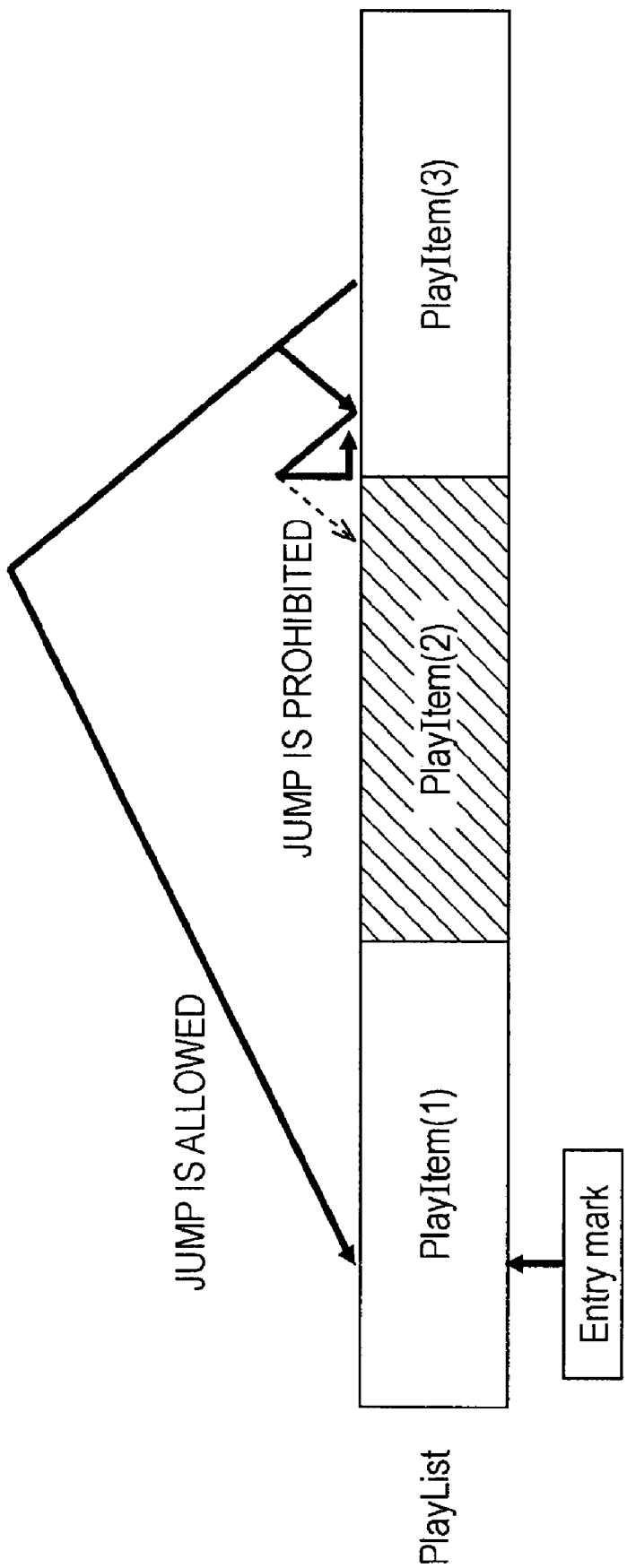
FIG. 20 is a diagram illustrating PlayItem_random_access_flag.

In the example shown in FIG. 20, an Entry Mark is defined in PlayItem(1) for which PlayItem_random_access_flag=0. When a Clip AV stream pointed to by PlayItem(3) for which PlayItem_random_access_flag is set to 0 is being played back, if a user operation occurs to request a fast-backward operation, the fast-backward operation is permitted within PlayItem(3). However, if the playback position reaches PlayItem(2) for which PlayItem_random_access_flag=1, a further fast-backward operation is not permitted, and playback is performed from the beginning of PlasyItem(3) at a normal speed (not at a fast speed).

Note that in the example shown in FIG. 20, when a Clip AV stream pointed to by PlayItem(3) is being played back, if a jump to the Entry mark in PlayItem(1) for which PlayItem_random_access_flag is set to 0 is requested, the request for the jump is accepted.

Figure 21:
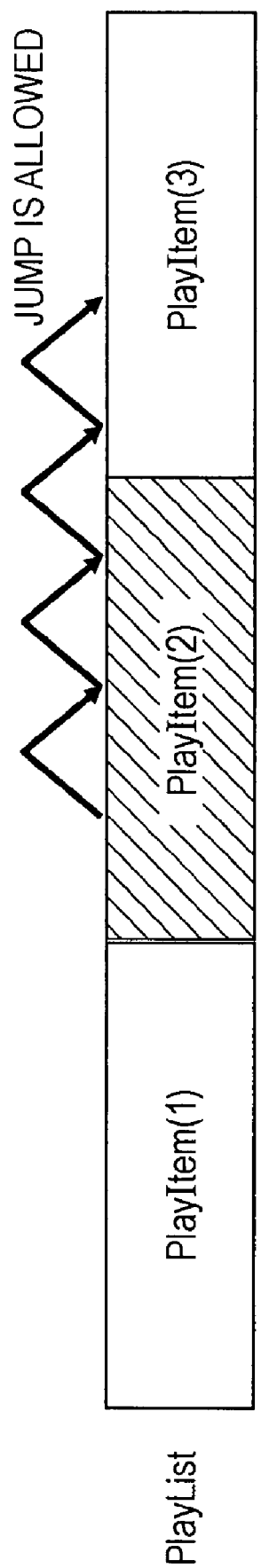
FIG. 21 is a diagram illustrating PlayItem_random_access_flag.

On the other hand, in the example shown in FIG. 21, when a Clip AV stream pointed to by PlayItem(2) for which PlayItem_random_access_flag is set to 1 is being played back, if a user operation occurs to request a fast-forward operation, the requested fast-forward operation is permitted because any jump within the same PlayItem even for PlayItem(2) is permitted. As a matter of course, when the playback position reaches PlayItem(3) for which PlayItem_random_access_flag=0, a further fast-forward operation is permitted.

Although not shown in the figures, when a Clip AV stream pointed to by PlayItem(2) for which PlayItem_random_access_flag is set to 1 is being played back, if a user operation occurs to request a fast-backward operation, the requested fast-backward operation is permitted because any jump within the same PlayItem even for PlayItem(2) is permitted. As a matter of course, when the playback position reaches PlayItem(1) for which PlayItem_random_access_flag=0, a further fast-backward operation is permitted.

Figure 22:
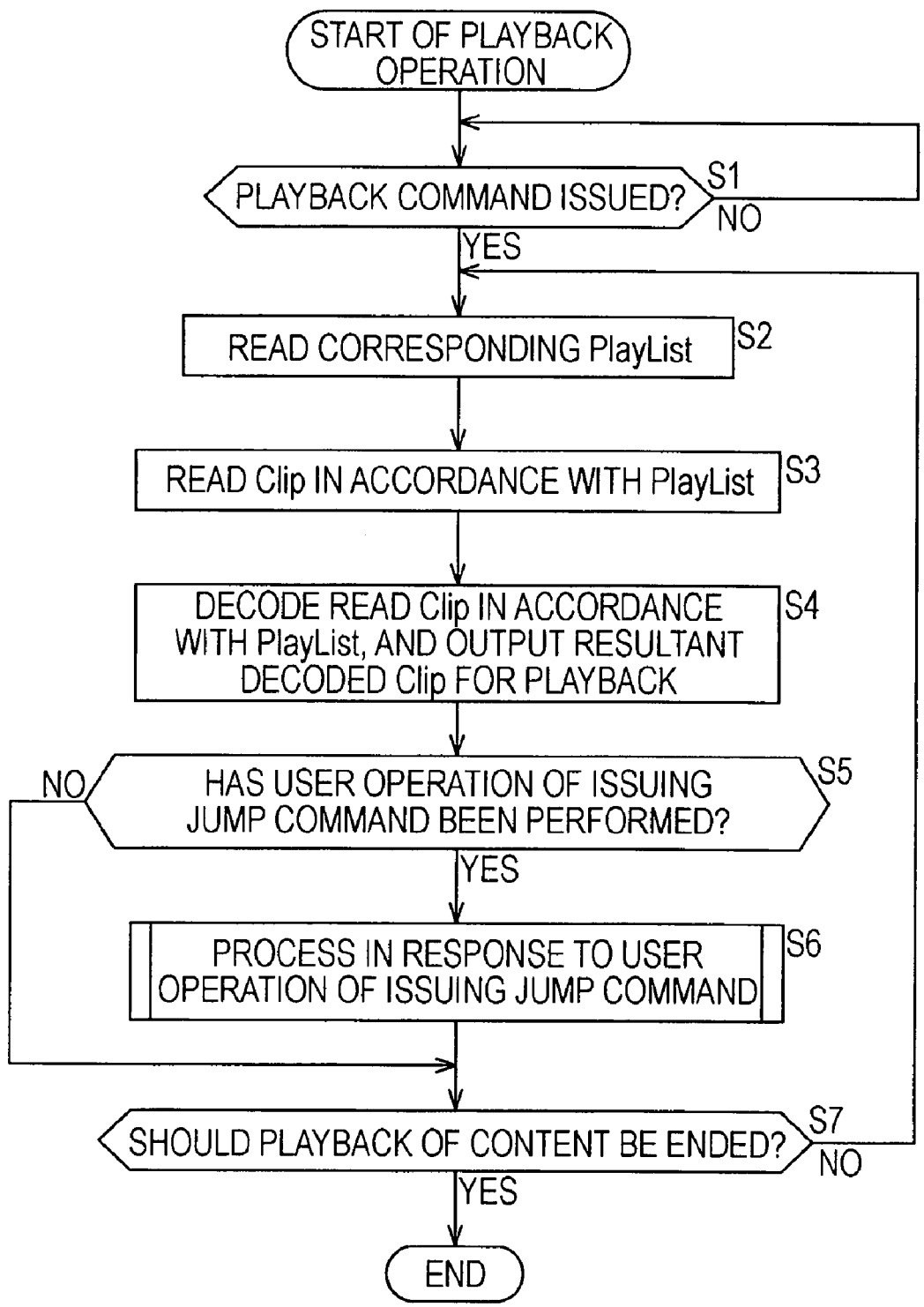
FIG. 22 is a flow chart showing a playback operation.

Next, referring to a flow chart shown in FIG. 22, a playback operation performed by the playback apparatus 1 is described.

In step S1, if the controller 21 detects an inputting operation performed on the operation input unit 29 by a user, the controller 21 determines whether the operation performed by the user is to request playback of a content stored in the storage medium 11 or the local storage 24. If it is determined in step S1 that no user operation of requesting playback of a content is detected, step S1 is repeated until a user operation of requesting playback of a content occurs.

If it is determined in step S1 that a user operation of requesting playback of a content has occurred, then in step S2, the controller 21 reads PlayList, specified by the navigation program, of the content stored on the storage medium 11 or in the local storage 24.

In step S3, the controller 21 reads a Clip pointed to by the read PlayList, and reads a Clip AV stream (by converting a time stamp of the PlayItem included in the PlayList in accordance with Clip information and then accessing the Clip AV stream). The controller 21 supplies the read Clip AV stream to the AV decoder 26.

In step S4, the controller 21 controls the AV decoder 26 in accordance with the read PlayList such that the content specified by the PlayItem is decoded and the result is sequentially output.

In step S5, the controller 21 determines whether a user operation has occurred to request a jump. If it is determined in step S5 that a user operation to request a jump has not occurred, the process proceeds to step S7, which will be described later.

Figure 23:
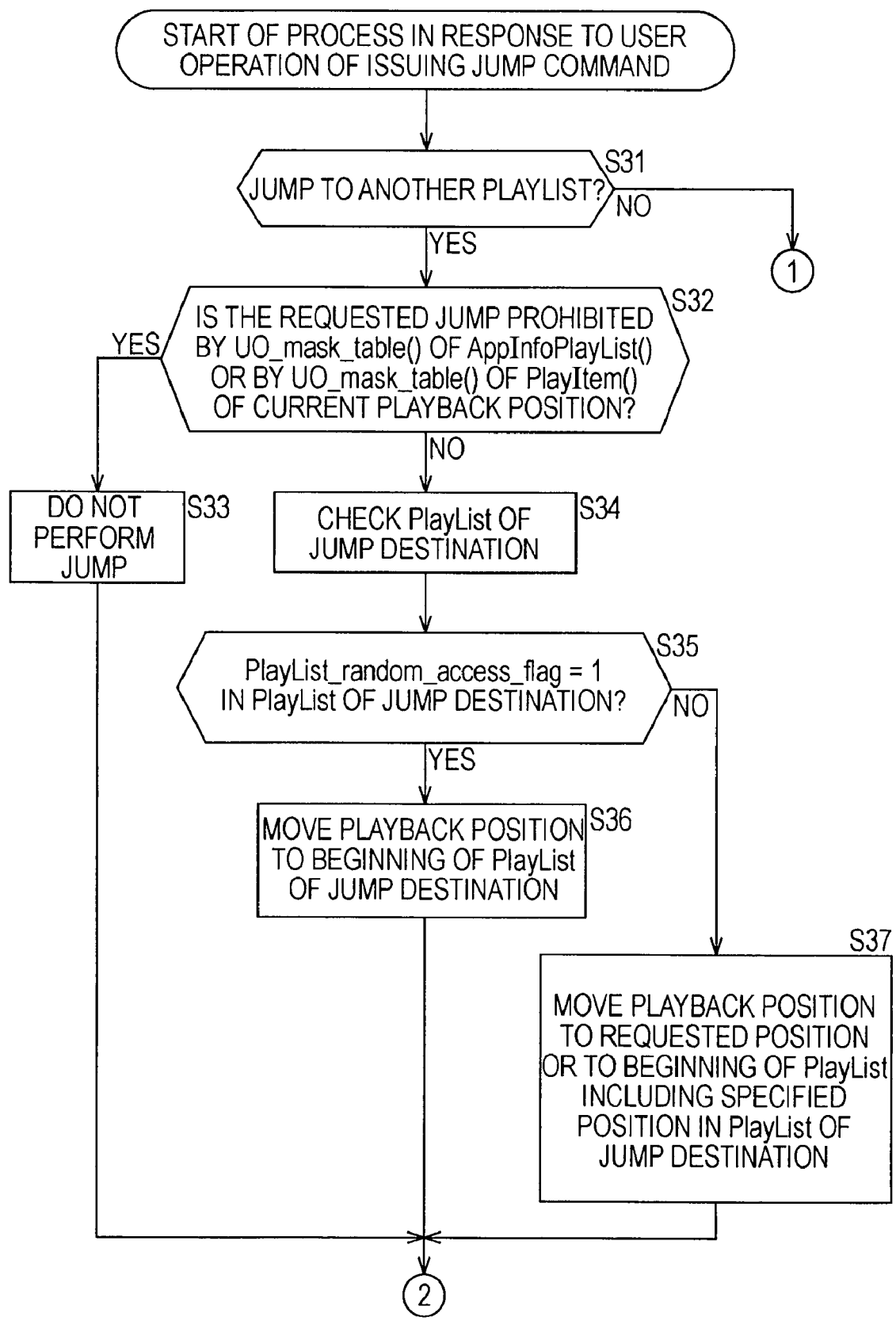
FIG. 23 is a flow chart showing a process performed in response to an occurrence of a user operation of issuing a jump command.
Figure 24:
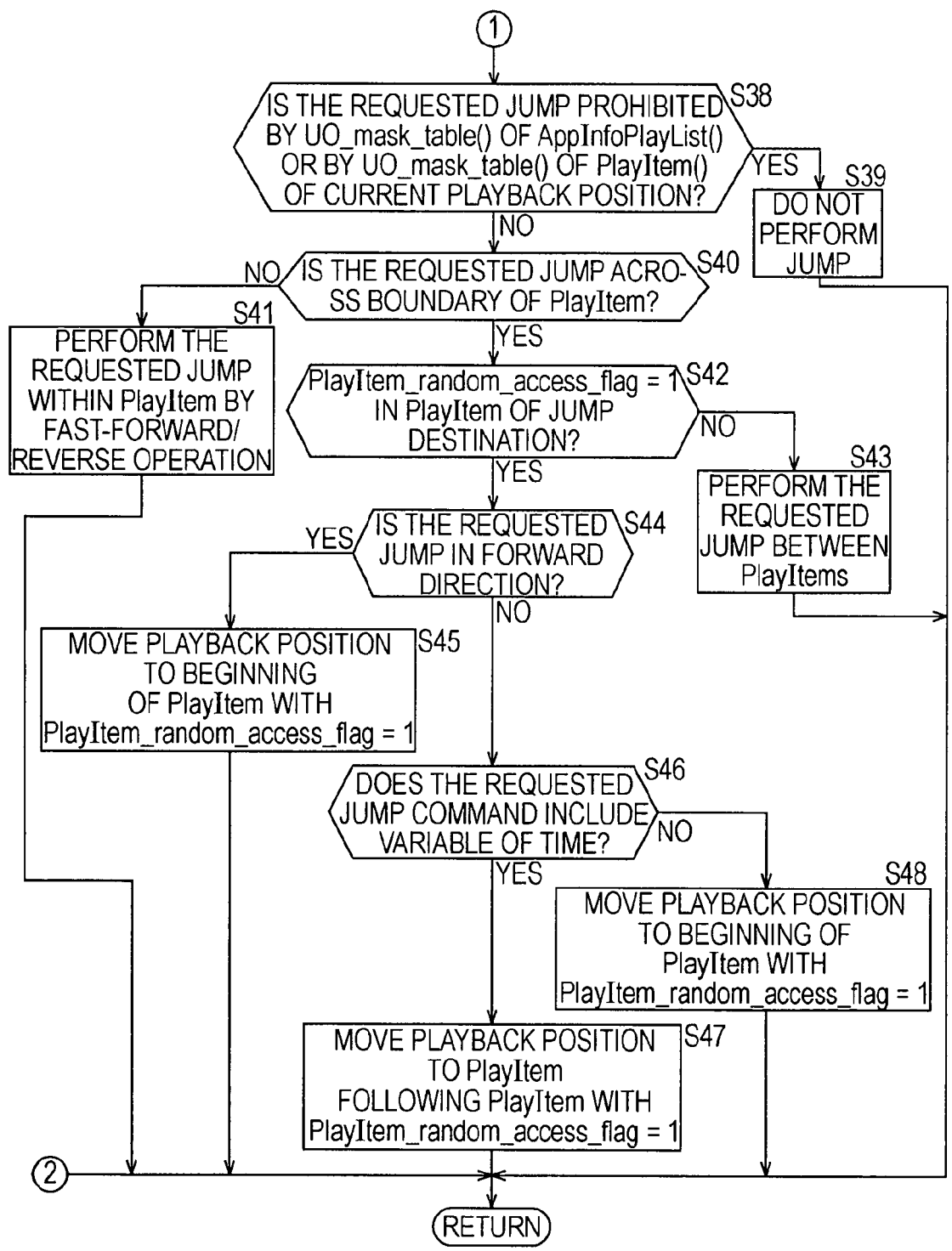
FIG. 24 is a flow chart showing a process performed in response to an occurrence of a user operation of issuing a jump command.

If it is determined in step S5 that a user operation to request a jump has occurred, then in step S6, a process is performed in accordance with the user operation of requesting the jump, as described later with reference to FIGS. 23 and 24.

In a case where it is determined in step S5 that an occurrence of a user operation of requesting a jump is not detected, or if step S6 is completed, the process proceeds to step S7. In step S7, the controller 21 determines whether the content playback operation should be ended by checking whether a content playback end command has been input by a user, or the playback position has reached the end of the content.

If it is determined in step S7 that the playback of the content should not be ended, the processing flow returns to step S2 to repeat the process from step S2. In a case where it is determined in step S7 that playback of the content should be ended, the process is ended.

Next, referring to FIGS. 23 and 24, the operation performed in step S6 in FIG. 22 in response to the user operation of requesting the jump is described below.

In step S31, the controller 21 determines whether the jump requested by the user operation is to another PlayList. If it is determined in step S31 that the requested jump is not to another PlayList, that is, the requested jump is within the same PlayList, the processing flow proceeds to step S38 which will be described later.

In a case where it is determined in step S31 that the requested jump is to another PlayList, then, in step S32, the controller 21 determines whether the jump requested by the user operation is prohibited by checking UO_mask_table( ) of AppInfoPlaylist( ) of the PlayList being currently played back or UO_mask_table( ) of PlayItem( ) of the PlayItem being currently played back.

If it is determined in step S32 that UO_mask_table( ) of AppInfoPlaylist( ) or UO_mask_table( ) of PlayItem( ) is set such that the jump requested by the user operation is prohibited, then in step S33, the controller 21 determines that the jump requested by the user operation should not be performed, and the controller 21 returns the processing flow to step S6 in FIG. 22. The processing flow then proceeds to step S7.

In a case where it is determined in step S32 that UO_mask_table( ) of AppInfoPlaylist( ) or UO_mask_table( ) of PlayItem( ) is set such that the jump requested by the user operation is no prohibited, then in step S34 the controller 21 examines a PlayList to which to jump.

In step S35, the controller 21 determines whether PlayList_random_access_flag=1 in the PlayList to which to jump.

If it is determined in step S35 that PlayList_random_access_flag=1 in the PlayList to which to jump, then in step S36, the controller 21 moves the playback position to the beginning of the PlayList specified as the jump destination. The controller 21 then returns the processing flow to step S6 in FIG. 22. The processing flow then proceeds to step S7.

In a case where it is determined in step S35 that PlayList_random_access_flag is not set to 1 in the Playlist of the jump destination, then in step S37 the controller 21 performs playback from a specified point in the Playlist of the jump destination. Note that before the playback of the PlayItem is started, a process is performed in a similar manner to the process performed when playback is started from a specified point in PlayList, and thus when PlayItem_random_access_flag is set to 1 in the PlayItem of the destination, playback is performed from the beginning of the PlayItem including the point specified as the destination. After this process, the processing flow returns to step S6 in FIG. 22 and proceeds to step S7.

In a case where it is determined in step S31 that the requested jump is not to another PlayList, that is, if the requested jump is within the current PlayList, then in step S38, the controller 21 determines whether UO_mask_table( ) of the AppInfoPlaylist( ) of the current position or by UO_mask_table( ) of the PlayItem of the current position is set such that the jump requested by the user operation is prohibited.

If it is determined in step S38 that UO_mask_table( ) of the AppInfoPlaylist( ) or UO_mask_table( ) of the PlayItem( ) is set such that the jump requested by the user operation is prohibited, then in step S39 the controller 21 rejects the user operation and returns the processing flow to step S6 in FIG. 22 without executing the requested jump. The processing flow then proceeds to step S7.

On the other hand, in the case where it is determined in step S38 that UO_mask_table( ) of the AppInfoPlaylist( ) and UO_mask_table( ) of the PlayItem are set such that the jump requested by the user operation is not prohibited, then in step S40, the controller 21 determines whether the requested jump is between different PlayItems.

In a case where it is determined in step S40 that the requested jump is not between different PlayItems, then in step S41, the controller 21 executes the requested jump process by performing the fast-forward/backward operation within the PlayItem, because in this case, as described above with reference to FIG. 21, any jump within the same PlayItem by the fast-forward/backward operation or the like is permitted even if PlayItem_random_access_flag is set to 1 in the PlayItem. Thereafter, the processing flow returns to step S6 in FIG. 22 and proceeds to step S7.

On the other hand, if it is determined in step S40 that the requested jump is across a boundary of the PlayItem, then in step S42, the controller 21 determines whether PlayItem_random_access_flag is set to 1 in the PlayItem of the jump destination.

In a case where it is determined in step S42 that PlayItem_random_access_flag is not set to 1, that is, PlayItem_random_access_flag is set to 0 for the PlayItem of the jump destination, then in step S43, as described above with reference to FIG. 16, 17, or 18, the controller 21 performs the jump process between PlayItems. Thereafter, the processing flow returns to step S6 in FIG. 22 and proceeds to step S7.

In a case where it is determined in step S42 that PlayItem_random_access_flag is set to 1 for the PlayItem of the jump destination, then in step S44, the controller 21 determines whether the requested jump is in a forward direction.

If it is determined in step S44 that the requested jump is in the forward direction, then in step S45, as described above with reference to FIG. 14 or 19, the controller 21 moves the playback position to the beginning of a PlayItem for which PlayItem_random_access_flag is set to 1. Thereafter, the processing flow returns to step S6 in FIG. 22 and proceeds to step S7.

In a case where it is determined in step S44 that the requested jump is not in the forward direction, that is, the requested jump is in a backward direction, then in step S46, the controller 21 determines whether the requested jump is a jump performed using a variable of time (that is, whether the requested jump is the fast-backward operation).

In a case where it is determined in step S46 that the requested jump is a jump performed using a variable of time (that is, the requested jump is the fast-backward operation), then in step S47, as described above with reference to FIG. 20, the controller 21 starts playback at a normal speed from a PlayItem following a PlayItem for which PlayItem_random_access_flag is set to 1. Thereafter, the processing flow returns to step S6 in FIG. 22 and proceeds to step S7.

In a case where it is determined in step S46 that the requested jump is not a jump performed using a variable of time (that is, the requested jump is not the fast-backward operation), then in step S48, as described above with reference to FIG. 15, the controller 21 moves the playback position to the beginning of a PlayItem for which PlayItem_random_access_flag is set to 1. The processing flow then returns to step S6 in FIG. 22 and proceeds to step S7.

As described above, non-normal playback operations during playback of a content are controlled in accordance with UO_mask_table( ) of AppInfoPlaylist( ), UO_mask_table( ) of PlayItem( ), PlayList_random_access_flag, and PlayItem_random_access_flag.

In other words, content suppliers (produces, sellers, providers, etc.) are allowed to control non-normal playback operations of particular parts of contents by setting flags including at least two-layer flags one of which is associated with PlayLists and the other one is associated with PlayItems such that jumping from the outside of PlayLists is controlled by PlayList_random_access_flag and jumping and playback at non-normal speeds within PlayLists are controlled by PlayItem_random_access_flag.

UO_mask_table restricts a user operation during a period in which a corresponding range of a content is being played back. In contrast, PlayList_random_access_flag and PlayItem_random_access_flag restrict user operations of requesting a jump into a corresponding PlayList or PlayItem from the outside of PlayList or PlayItem. In other words, PlayList_random_access_flag and PlayItem_random_access_flag restrict a playback operation of skipping a particular part (of PlayList or PlayItem for which the corresponding flag is set).

When PlayList_random_access_flag=1 for a Playlist, if a user operation occurs to request a jump from the outside of the PlayList to a particular point in the PlayList other than the beginning of the PlayList, the playback operation is forced to be performed such that playback is performed from the beginning of the PlayList.

Depending on setting of PlayItem_random_access_flag, restrictions are imposed on playback operations at non-normal speeds operations such as "Chapter search", "Time search", "Skip to next point", "Skip back to previous point", "Forward Play", or "Backward Play" requested by user operations.

When data is played back by the playback apparatus 1 according to the present invention, a Clip AV stream corresponding to actual video and audio data is played back in accordance with PlayLists and PlayItems. Thus, in the playback apparatus 1 according to the present invention, non-normal playback operations are controlled not according to access_restricted_cell employed in conventional DVD video (see DVD-Video standard, part 3) but controlled hierarchically according to two types of flags, PlayList_random_access_flag and PlayItem_random_access_flag.

In the DVD video standard, only user operations associated with playback at non-normal speeds such as a fast-forward/ backward operation are controlled, and no restrictions are imposed on search-based user operations. Therefore, in the DVD video standard, as described above with reference to FIG. 1, setting of prohibition of the fast-forward operation for a part for which only the normal playback operation should be permitted can not perfectly prevent this part from being skipped without being played back, because the part can be skipped, for example, by a jump-to-next-chapter command. In contrast, in data for use of playback by the playback apparatus 1 according to the present invention, not only restrictions on non-normal-speed playback operations (Forward Play and Backward Play) in response to user operations can be defined, but also restrictions on search operations in response to user operations, such as Chapter Search, Time Search, Skip to next point, and Skip back to previous point, can be defined by PlayItem_random_access_flag.

In data for use of playback by the playback apparatus 1 according to the present invention, when an Entry Mark is defined in a PlayItem for which PlayItem_random_access_flag is set to 1, as described above with reference to FIGS. 14 and 15, if a user operation occurs to request a jump (Chapter Search) to the Entry Mark in the PlayItem for which PlayItem_random_access_flag is set to 1, a jump (Time Search) to a particular point specified in time in the PlayItem for which PlayItem_random_access_flag is set to 1, or a search-based jump such as the Skip to next point operation or the Skip back to previous point operation, then the playback position jumps to the beginning of the PlayItem for which PlayItem_random_access_flag is set to 1.

In Chapter Search and Time Search, a jump can occur such that PlayItem for which PlayItem_random_access_flag is set to 1 is skipped, depending on an argument indicating a specified chapter number or time stamp of a specified jump destination. When it is desired to also prohibit such a jump, UO_mask_table( ) of AppInfoPlayList( ) or UO_mask_table( ) of each PlayItem( ) included in PlayList is defined such that Chapter Search and Time Search are prohibited. This makes it possible to prohibit any jump which causes a PlayItem to be skipped.

When no Entry Mark is defined in PlayItem for which PlayItem_random_access_flag is set to 1, as described above with reference to FIGS. 17 and 18, if the playback position is changed by using "Skip to next point" or "Skip back to previous point", it is allowed to change the playback position so as skip PlayItem for which PlayItem_random_access_flag is set to 1. Thus, content suppliers (produces, sellers, providers, etc.) are allowed to control non-normal playback operations in a manner in which intention thereof is precisely reflected.

Thus it is possible to prohibit skipping or non-normal-speed playback for a particular part of a content, such as a warning (FBI warning) screen to be displayed at the beginning of the content to indicate a warning about a copyright, a warning screen indicating that the content is for adults, or a general advertisement.

For example, when data for use of playback by the playback apparatus 1 according to the present invention is formed so as to allow a content to be played back in an interactive manner, that is, for example, when it is allowed not only to start playback from a desired point in a desired order, but it is also allowed to display an image as viewed from a selected one of various angles by using a multi-angle function, select a desired language from various languages by using a multi-language function, and/or prohibit playback of scenes of a particular kind such as scenes of violence by using a parental control function, it is necessary to display branch screens or notification messages to notify a user of playback branch points or the like. Note that it is necessary that those branch screens or notification messages must be detected by users without being missed.

However, if a playback operation at a non-normal speed makes it impossible or difficult for a user to detect a branch screen or a notification message notifying the user of a playback branch point, the playback operation such as the fast-forward operation can cause a user to miss the branch screen or the notification message that should be presented to the user.

To prevent the above problem, it is desirable to define entry_mark in PlayItem of a branch screen or a notification message for notifying a user of a branch point, and set PlayItem_random_access_flag=1 thereby ensuring that the branch screen or the notification message is displayed without being skipped. In this case, UO_mask_table( ) of AppInfoPlayList( ) of PlayList including the branch screen may be defined such that only chapter search and time search are prohibited, but Skip to next point", "Skip back to previous point", "Forward Play", and "Backward Play" are not prohibited so that "Skip to next point", "Skip back to previous point", "Forward Play", and "Backward Play" are allowed unless the PlayItem for which PlayItem_random_access_flag is set to 1 is tried to be subjected to such a non-normal playback operation, and thus no degradation in operability occurs.

If PlayList_random_access_flag and PlayItem_random_access_flag according to the present invention are not used, UO is restricted only by UO_mask_table, which can cause great degradation in user operability. UO_mask can define only permission/prohibition of UO in PlayList or PlayItem being currently played back, and UO_mask is not allowed to define restrictions on destination points of jumps. On the other hand, use of PlayList_random_access_flag and PlayItem_random_access_flag makes it possible to define restrictions on playback at destinations of jumps.

For a content in which a quiz is displayed for a certain period of time and an answer is presented at the end of the period, it is possible to prevent the quiz from being skipped by the fast-forward operation or the chapter search and thus prevent the answer from being directly displayed. Also in this case, it is desirable to set UO_mask to restrict "Skip to next point", "Skip back to previous point", "Forward Play" and "Backward Play".

That is, in data for use of playback by the playback apparatus 1 according to the present invention, as described above, ranges (defined by PlayItems) during which non-normal playback operations are prohibited are managed separately from chapters (Entry Points defined by PlayListMark( )), and non-normal playback operations are controlled using two types of flags. That is, one flag (PlayItem_random_access_flag) is used to control playback operations at non-normal speeds in PlayItem and jump playback operations (search-based jump operations), and the other flag (PlayList_random_access_flag) is used to control jumps between PlayLists including a plurality of PlayItems. In other words, in data for use of playback by the playback apparatus 1 according to the present invention, restrictions on non-normal playback operations are defined in a hierarchical manner using two types of flags.

Thus, it becomes possible to prevent a range (defined by a PlayItem) for which non-normal playback operations are prohibited from being skipped by the chapter jump, and it also becomes possible to control non-normal playback operations even for AV data managed by a plurality of PlayLists.

Figure 25:
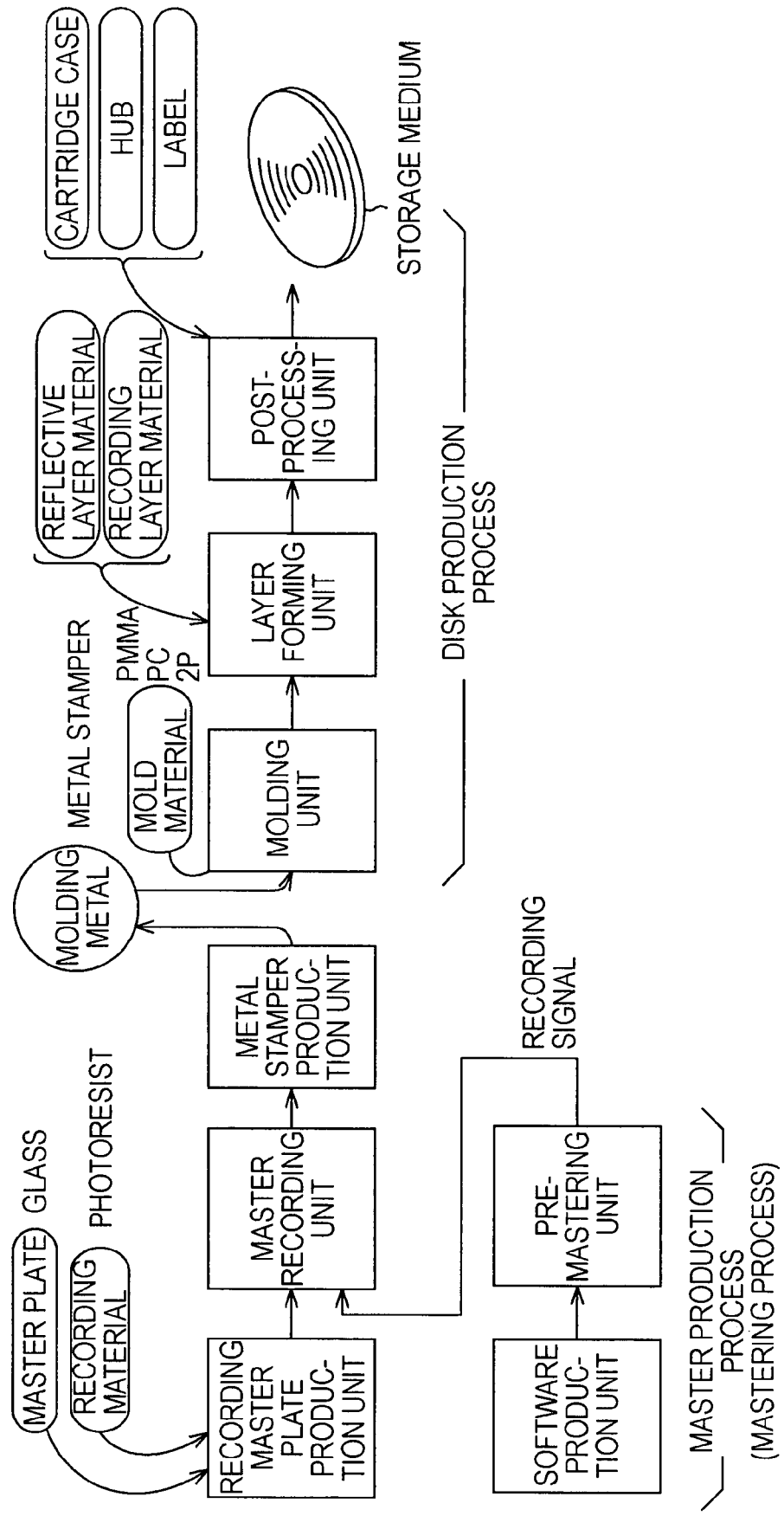
FIG. 25 is a diagram illustrating a process of producing a storage medium on which data playable by a playback apparatus is stored.
Figure 26:
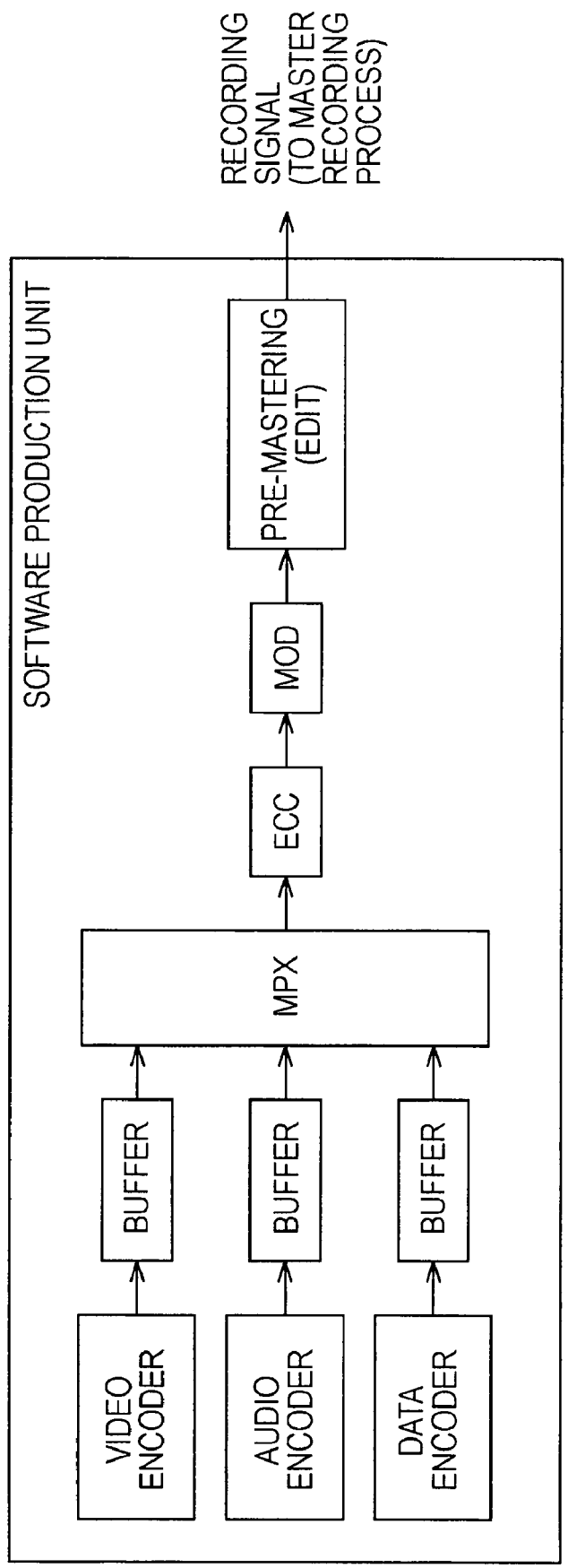
FIG. 26 is a diagram illustrating a process of producing a storage medium on which data playable by a playback apparatus is stored.

Next, referring to FIGS. 25 and 26, a process of producing the storage medium 11 on which data playable by the playback apparatus 1 is stored is described. Note that it is assumed herein that the storage medium 11 is formed in a disk shape.

As shown in FIG. 25, a master plate of glass or the like is prepared, and a recording material such as a photoresist is coated on the master plate to form a recording master plate.

Next, as shown in FIG. 26, in a software production unit, video data encoded by an encoder (video encoder) into a form playable by the playback apparatus 11 is temporarily stored in a buffer, audio data encoded by an audio encoder is temporarily stored in a buffer, and data (such as Indexes, PlayList, PlayItem, etc.) encoded by a data encoder other than stream data is temporarily stored in a buffer. The video data, the audio data, and other data stored in the respective buffers are multiplexed together with a synchronization signal by a multiplxer (MPX), and error correction codes are added thereto by an error correction code circuit (ECC). The resultant data is modulated by a modulator (MOD) and stored in a predetermined format temporarily on a magnetic tape or the like, thus software to be stored on the storage medium 11 playable by the playback apparatus 1 is produced.

The produced software is edited (pre-mastered) as required, and a signal in a format for storage on an optical disk is produced. A laser beam is modulated in accordance with the produced recording signal, and the photoresist on the master plate is illuminated with the laser beam. Thus, the photoresist on the master plate is exposed according to the recording signal.

The master plate is then developed to form pits on the master plate. The resultant master plate is then subjected to electroforming or the like to produce a metal mater plate having bits transferred from the glass master plate. A metal stamper for use as a metal mold is then produced from the metal master plate.

A material such as PMMA (polymethylmethacrylate) or PC (polycarbonate) is put into the metal mold, for example, by injection and solidified. Alternatively, 2P (ultraviolet-curing resin) or the like may be coated on the metal stamper and irradiated with a ultraviolet ray to cure the resin. As a result, the pit pattern is transferred from the metal stamper to a resin replica.

A reflective film is then formed on the replica by evaporation or sputtering. Alternatively, a reflective film may be formed on the replica by spin coating.

Thereafter, the obtained disk is subjected to a finishing process to properly shape the inner and outer peripheries. If required, two disks are bonded together into a single form. Furthermore, after a label is stuck and a hub is attached to the disk, the resultant disk is inserted into a cartridge. Thus, a complete storage medium 11 on which data playable by the playback apparatus 1 is stored is obtained.

The process described above may be executed by software. When the process is executed by software, a program forming the software may be installed from a storage medium onto a computer which is provided as dedicated hardware or may be installed onto a general-purpose computer capable of performing various processes in accordance with various programs installed thereon.

Figure 27:
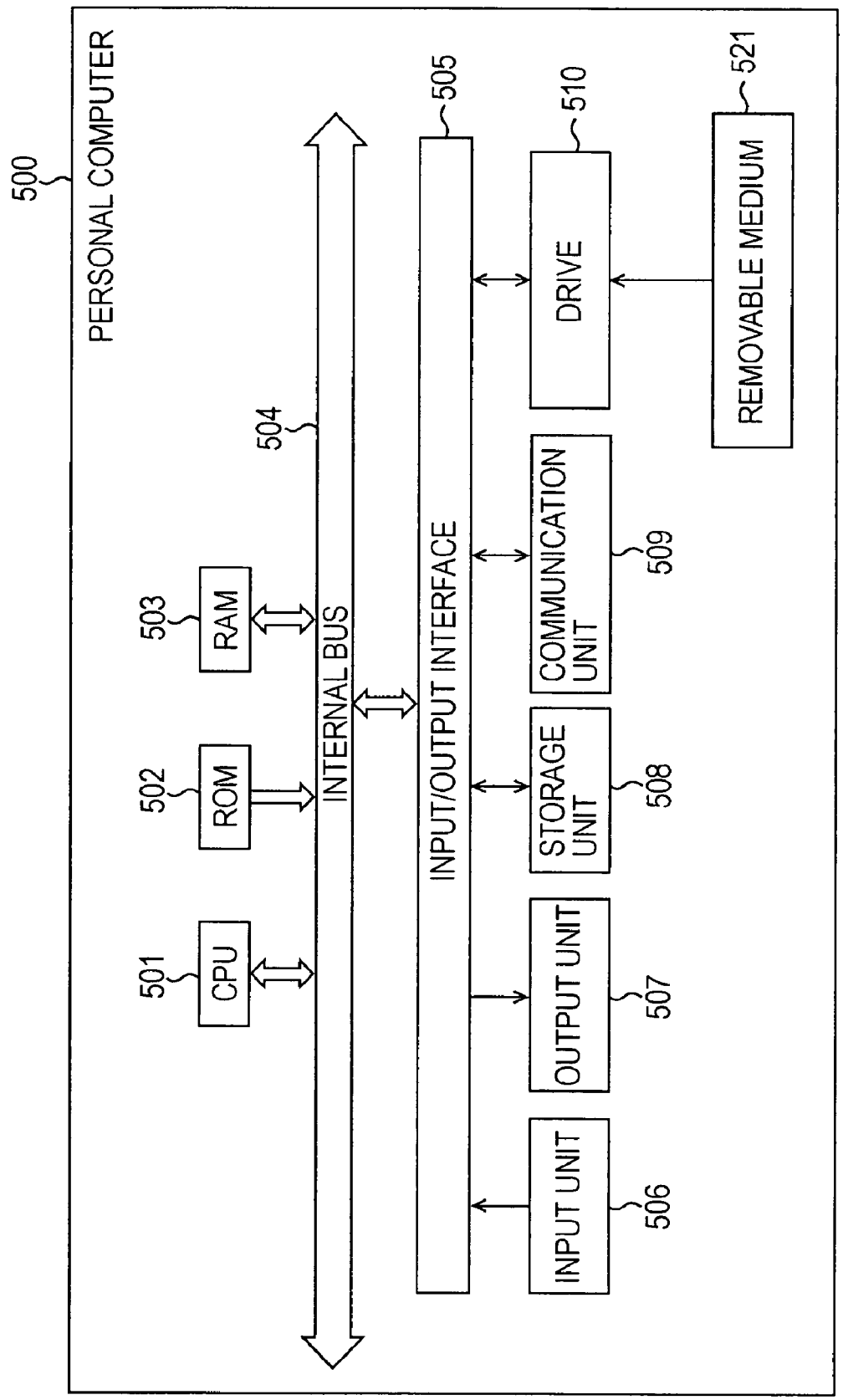
FIG. 27 is a diagram illustrating a configuration of a personal computer.

For example, a personal computer 500 shown in FIG. 27 may be used to execute the sequence of processing steps.

As shown in FIG. 27, a CPU (Central Processing Unit) 501 performs various processes in accordance with a program stored in a ROM (Read Only Memory) 502 or in accordance with a program loaded into a RAM (Random Access Memory) 503 from a storage unit 508. The RAM 503 is also used to store data used by the CPU 501 in the execution of various processes.

The CPU 501, the ROM 502, and the RAM 503 are connected to each other via a bus 504. The bus 504 is also connected to an input/output interface 505.

The input/output interface 505 is also connected to an input unit 506 including a keyboard, a mouse, and the like, an output unit 507 including a display such as a CRT or a LCD and a speaker, a storage unit 508 such as a hard disk, and a communication unit 509 such as a modem or a terminal adapter. The communication unit 509 is adapted to perform communication via networks such as a telephone network or a CATV network.

Furthermore, the input/output interface 505 is also connected with a drive 510, as required. A removable storage medium 521 such as a magnetic disk, an optical disk, a magnetooptical disk, or a semiconductor memory is mounted on the drive 510 as required, and a computer program is read from the removable storage medium 521 and installed into the storage unit 508, as required.

When the processing sequence is executed by software, a program forming the software may be installed from a storage medium or via a network onto a computer.

The storage medium may be provided in the form of a removable medium 28 as shown in FIG. 3 or a removable medium 521 shown in FIG. 27, on which a program is stored and which is supplied to a user separately from a computer. Various types of storage media are available for the above purpose. Specific examples include a magnetic disk (such as a floppy disk), an optical disk (such as a CD-ROM (Compact Disk-Read Only Memory) and a DVD (Digital Versatile Disk)), a magnetooptical disk (such as a MD (Mini-Disk) (trademark)), and a semiconductor memory.

In the present description, the steps described in the program stored in the storage medium may be performed either in time sequence in accordance with the order described in the program or in a parallel or separate fashion.

The drive 510 is capable of not only reading data from the removable medium 521 mounted on the drive 510 but also storing data on the removable medium 521. Note that the personal computer 500 also has a capability similar to that of the software production unit described above with reference to FIG. 26 (the capability is realized by executing a program, similar to that executed by the software production unit, by using the CPU 501).

More specifically, the personal computer 500 is capable of acquiring data similar to the data produced by the software production unit described above with reference to FIG. 26, by producing the data by performing a process using the CPU 501, or by receiving the data via the communication unit 509 or reading the data from the removable medium 521 mounted on the drive 510. The personal computer 500 is also capable of functioning as a storage apparatus. This capability allows the produced or acquired data similar to that produced by the software production unit described above with reference to FIG. 26 to be stored on the removable medium 521 mounted on the drive 510.

In the present specification, the term "system" is used to describe the entirety of an apparatus including a plurality of sub-apparatuses.

The present invention is not limited to the embodiments described above, but various modifications are possible without departing from the scope of the present invention.

The invention claimed is:

1. A playback apparatus comprising:
    playback control means adapted to acquire second playback management information for managing playback of a content file including at least one stream comprising a plurality of play items and control playback of the content file in accordance with the acquired second playback management information, the second playback management information including at least one piece of first playback management information including information indicating a position, on a playback time axis, of the content file; and playback means for playing back the content file under the control of the playback control means, wherein:
the second playback management information includes jump destination information indicating a destination of a playback position jump and first permission information indicating whether to accept a first user operation of requesting a jump of the playback position to a point in a stream whose playback is managed by the second playback management information in a state in which a stream whose playback is managed by another second playback management information is being played back;

the first playback management information includes second permission information indicating whether to accept a second user operation of requesting a jump of the playback position to a point in a stream whose playback is managed by the first playback management information in a state in which a stream whose playback is managed by another first playback management information included in the same second playback management information is being played back; and when the second permission information indicates that a random access to content of a first play item from the plurality of play items is prohibited, and the second user operation requests a jump from a playback position located within content of a second play item from the plurality of play items to a position within the content of the first play item, the requested jump is not permitted and the playback position is permitted to be moved from the second play item to a beginning of the first play item.

2. The playback apparatus according to claim 1, wherein the second permission information is information indicating whether to accept a user operation of requesting the jump of the playback position, by a playback operation at a non-normal speed, to the point in a stream whose playback is managed by second permission information.

3. The playback apparatus according to claim 1, wherein the second permission information is information indicating whether to accept a user operation of requesting the jump of the playback position to the point in the stream whose playback is managed by the first playback management information, the point indicated by the jump destination information.

4. The playback apparatus according to claim 1, wherein:
when the first permission information is defined so as not to accept a user operation of requesting the jump of the playback position to any point in the stream whose playback is managed by the second playback management information, the playback control means controls the playback of the content file such that the playback position is moved to the beginning of the stream whose playback is managed by the second playback management information.

5. The playback apparatus according to claim 1, wherein:
when the second permission information is defined so as not to accept a user operation of requesting the jump of the playback position to any point in the stream whose playback is managed by the first playback management information, when the playback position from which to make the jump is temporally prior to the stream whose playback is managed by the first playback management information or if the requested jump is performed without using a variable of time, then the playback control means controls the playback of the content file such that the playback position is moved to the beginning of the stream whose playback is managed by the first playback management information.

6. The playback apparatus according to claim 1, wherein:
when the second permission information is defined so as not to accept a user operation of requesting the jump of the playback position to any point in the stream whose playback is managed by the first playback management information, when the requested jump is performed without using a variable of time and if the playback position from which to make the jump is temporally subsequent to the stream whose playback is managed by the first playback management information then the playback control means controls the playback of the content file such that the playback position is moved to the beginning of a stream following the stream whose playback is managed by the first playback management information.

7. The playback apparatus according to claim 1, wherein:
the first playback management information further includes user operation restriction information defining one or more user operations which should not be accepted during playback of the stream whose playback is managed by the first playback management information, and when a first user operation occurs in a state in which the stream whose playback is managed by the first playback management information is being played back, when the first user operation is one of those which are defined as unacceptable in the user operation restriction information, the playback control means prohibits acceptance of the first user operation.

8. The playback apparatus according to claim 1, wherein:
the second playback management information further includes user operation restriction information defining one or more user operations which should not be accepted during playback of the stream whose playback is managed by the second playback management information, and when a first user operation occurs in a state in which the stream whose playback is managed by the second playback management information is being played back, when the first user operation is one of those which are defined as unacceptable in the user operation restriction information, the playback control means prohibits acceptance of the first user operation.

9. The playback apparatus according to claim 1 wherein the destination of the playback position jump designated by the jump destination information is set independently of a playback range of the stream whose playback is managed by the first playback management information.

10. A playback method for a playback apparatus adapted to play back a content file, the method comprising the steps of:
acquiring second playback management information for managing playback of the content file including at least one stream comprising a plurality of play items, the second playback management information including at least one piece of first playback management information including information indicating a position, on a playback time axis, of the content file;

controlling playback of the content file in accordance with the acquired second management information and the first management information included in the second management information, wherein:

the second playback management information includes jump destination information indicating a destination of a playback position jump and first permission information indicating whether to accept a first user operation of requesting a jump of the playback position to one of points in a stream whose playback is managed by the second playback management information in a state in which a stream whose playback is managed by another second playback management information is being played back;

the first playback management information includes second permission information indicating whether to accept a second user operation of requesting a jump of the playback position to one of points in a stream whose playback is managed by the first playback management information in a state in which a stream whose playback is managed by another first playback management information included in the same second playback management information is being played back; and when the second permission information indicates that a random access to content of a first play item from the plurality of play items is prohibited, and the second user operation requests a fast-forward operation from a playback position located within content of at least one second play item from the plurality of play items that precedes the first play item in the at least one stream, controlling playback of the content file comprises:

permitting content of the at least one second play item to be fast-forwarded from the playback position located within the content of the at least one second play item, and when the playback position reaches the first play item, permitting playback of the content of the first play item at a normal speed.

11. At least one non-transitory computer-readable storage medium encoded with computer-readable instructions that, when executed by a computer, perform a process of playing back a content file comprising a plurality of play items, the process comprising the steps of:

preparing information including first playback management information and second playback management information for use in playing back the content file;

when the second playback management information includes jump destination information indicating a destination of a playback position jump and first permission information indicating whether to accept a first user operation of requesting a jump of the playback position to one of points in a stream whose playback is managed by the second playback management information in a state in which a stream whose playback is managed by another second playback management information is being played back, and when the first playback management information includes second permission information indicating whether to accept a second user operation of requesting a jump of the playback position to one of points in a stream whose playback is managed by the first playback management information in a state in which a stream whose playback is managed by another first playback management information included in the same second playback management information is being played back, acquiring second playback management information including at least one piece of first playback management information including information indicating a position, on a playback time axis, of the content file including at least one stream; and controlling playback of the content file in accordance with the first management information included in the acquired second management information and the second permission information included in the first management information; wherein:

when the second permission information indicates that a random access to content of a first play item from the plurality of play items is prohibited and a random access to content of a second play item from the plurality of play items and content of a third item from the plurality of play items is permitted, and the second user operation requests a jump from a playback position located within the content of the second play item to a position within the content of the third play item, wherein the first play item is located in the content file between the second play item and the third play item, controlling playback of the content file comprises permitting the jump.

12. A non-transitory storage medium storing data including second playback management information for managing playback of a content file including at least one stream comprising a plurality of play items, the second playback management information including at least one piece of first playback management information including information indicating a position, on a playback time axis, of the content file, wherein:

the second playback management information includes jump destination information indicating a destination of a playback position jump and first permission information indicating whether to accept a first user operation of requesting a jump of the playback position to one of points in a stream whose playback is managed by the second playback management information in a state in which a stream whose playback is managed by another second playback management information is being played back;

the first playback management information includes second permission information indicating whether to accept a second user operation of requesting a jump of the playback position to one of points in a stream whose playback is managed by the first playback management information in a state in which a stream whose playback is managed by another first playback management information included in the same second playback management information is being played back; and when the second permission information indicates that a random access to content of a first play item from the plurality of play items is prohibited, and the second user operation requests a jump from a playback position located within content of a second play item from the plurality of play items to a position within the content of the first play item, the requested jump is not permitted and the playback position is permitted to be moved from the second play item to a beginning of the first play item.

13. A computer-readable storage medium device encoded with a data structure including second playback management information for managing playback of a content file including at least one stream comprising a plurality of play items, the second playback management information including at least one piece of first playback management information including information indicating a position, on a playback time axis, of the content file, wherein:
- the second playback management information includes jump destination information indicating a destination of a playback position jump and first permission information indicating whether to accept a first user operation of requesting a jump of the playback position to one of points in a stream whose playback is managed by the second playback management information in a state in which a stream whose playback is managed by another second playback management information is being played back;
- the first playback management information includes second permission information indicating whether to accept a second user operation of requesting a jump of the playback position to one of points in a stream whose playback is managed by the first playback management information in a state in which a stream whose playback is managed by another first playback management information included in the same second playback management information is being played back; and
- when the second permission information indicates that a random access to content of a first play item from the plurality of play items is prohibited, and the second user operation requests a jump from a playback position located within content of a second play item from the plurality of play items to a position within the content of the first play item, wherein the first play item precedes the second play item in the at least one stream, the requested jump is not permitted and the playback position is permitted to be moved from the second play item to a beginning of the first play item.

14. A method of encoding a storage medium with data playable by a playback apparatus, the method comprising, with at least one processor:
- producing data having a data structure including second playback management information for managing playback of a content file including at least one stream comprising a plurality of play items, the second playback management information including at least one piece of first playback management information including information indicating a position, on a playback time axis, of the content file; and
- encoding the storage medium with the produced data, wherein:
  - the second playback management information includes jump destination information indicating a destination of a playback position jump and first permission information indicating whether to accept a first user operation of requesting a jump of the playback position to one of points in a stream whose playback is managed by the second playback management information in a state in which a stream whose playback is managed by another second playback management information is being played back;
  - the first playback management information includes second permission information indicating whether to accept a second user operation of requesting a jump of the playback position to one of points in a stream whose playback is managed by the first playback management information in a state in which a stream whose playback is managed by another first playback management information included in the same second playback management information is being played back; and
  - when the second permission information indicates that a random access to content of a first play item from the plurality of play items is prohibited, and the second user operation requests a jump from a playback position located within content of a second play item from the plurality of play items to a position within the content of the first play item, the requested jump is not permitted and the playback position is permitted to be moved from the second play item to a beginning of the first play item.

15. A storage apparatus adapted to store data playable by a playback apparatus on a storage medium, the storage apparatus comprising:
- a module that acquires data having a data structure including second playback management information for managing playback of a content file including at least one stream comprising a plurality of play items, the second playback management information including at least one piece of first playback management information including information indicating a position, on a playback time axis, of the content file; and
- a circuit that stores the acquired data on the storage medium, wherein:
  - the second playback management information includes jump destination information indicating a destination of a playback position jump and first permission information indicating whether to accept a first user operation of requesting a jump of the playback position to one of points in a stream whose playback is managed by the second playback management information in a state in which a stream whose playback is managed by another second playback management information is being played back;
  - the first playback management information includes second permission information indicating whether to accept a second user operation of requesting a jump of the playback position to one of points in a stream whose playback is managed by the first playback management information in a state in which a stream whose playback is managed by another first playback management information included in the same second playback management information is being played back; and
  - when the second permission information indicates that a random access to content of a first play item from the plurality of play items is prohibited, and the second user operation requests a fast-forward operation from a playback position located within content of at least one second play item from the plurality of play items that precedes the first play item in the at least one stream, content of the at least one second play item is permitted to be fast-forwarded from the playback position located within the content of the at least one second play item and, when the playback position reaches the first play item, playback at a normal speed of the content of the first play item is permitted.

16. In a storage apparatus adapted to store data playable by a playback apparatus, a method for storing the data on a storage medium, the method comprising:
- acquiring data having a data structure including second playback management information for managing playback of a content file including at least one stream comprising a plurality of play items, the second playback management information including at least one piece of first playback management information including information indicating a position, on a playback time axis, of the content file; and storing the acquired data on the storage medium, wherein:
the second playback management information includes jump destination information indicating a destination of a playback position jump and first permission information indicating whether to accept a first user operation of requesting a jump of the playback position to one of points in a stream whose playback is managed by the second playback management information in a state in which a stream whose playback is managed by another second playback management information is being played back;
the first playback management information includes second permission information indicating whether to accept a second user operation of requesting a jump of the playback position to one of points in a stream whose playback is managed by the first playback management information in a state in which a stream whose playback is managed by another first playback management information included in the same second playback management information is being played back; and
when the second permission information indicates that a random access to content of a first play item from the plurality of play items is prohibited, and the second user operation requests a fast-forward operation from a playback position located within content of at least one second play item from the plurality of play items that precedes the first play item in the at least one stream, content of the at least one second play item is permitted to be fast-forwarded from the playback position located within the content of the at least one second play item and, when the playback position reaches the first play item, playback at a normal speed of the content of the first play item is permitted.

* * * * *